(12) United States Patent
Lester

(10) Patent No.: US 10,253,990 B2
(45) Date of Patent: Apr. 9, 2019

(54) HEATING SYSTEM

(71) Applicant: Flint Engineering Ltd., Mayfield (GB)

(72) Inventor: Stephen Lester, Mayfield (GB)

(73) Assignee: Flint Engineering LTD., Mayfield (GB)

( * ) Notice: Subject to any disclaimer, the term of this patent is extended or adjusted under 35 U.S.C. 154(b) by 0 days.

(21) Appl. No.: 15/319,376

(22) PCT Filed: Jun. 19, 2015

(86) PCT No.: PCT/GB2015/051794
§ 371 (c)(1),
(2) Date: Dec. 16, 2016

(87) PCT Pub. No.: WO2015/193681
PCT Pub. Date: Dec. 23, 2015

(65) Prior Publication Data
US 2017/0130969 A1 May 11, 2017

(30) Foreign Application Priority Data
Jun. 19, 2014 (GB) .................................. 1410932.6

(51) Int. Cl.
*F24D 11/02* (2006.01)
*F28D 15/02* (2006.01)
(Continued)

(52) U.S. Cl.
CPC .......... *F24D 11/0221* (2013.01); *F24S 10/72* (2018.05); *F24S 10/90* (2018.05);
(Continued)

(58) Field of Classification Search
CPC .. F28D 15/0233; F28D 15/0275; F28F 1/022; F28F 1/16; F28F 1/40; F28F 3/048;
(Continued)

(56) References Cited

FOREIGN PATENT DOCUMENTS

| DE | 102007024524 A1 | * 11/2008 | ........... F24D 3/1091 |
| GB | 2032613 A1 | 5/1980 | |

(Continued)

OTHER PUBLICATIONS

Search Report for GB 1410932.6, dated Sep. 26, 2014 (8 pages).
International Search Report and Written Opinion for PCT/GB2015/051794, dated Oct. 29, 2015 (13 pages).

*Primary Examiner* — Marc E Norman
(74) *Attorney, Agent, or Firm* — Patent Law Works LLP

(57) ABSTRACT

A system comprises: at least one heat exchange panel (700) comprising: a main body (100) comprising a sealed cavity in which is provided a fluid in both liquid and gas phases and being configured to communicate heat energy by allowing evaporation of the liquid at one location and condensation of the liquid at a different location in the cavity; and at least a first heat exchanger part (130, 210a, 211a) including an inlet and an outlet for allowing the passing of fluid through the heat exchanger, the first heat exchanger part being thermally coupled to the heat spreading part so as to communicate heat energy between fluid flowing through the first heat exchanger part and the heat spreading part and thus the environment in which the heat spreading part is present. A controller is configured to cause control of pumps and valves to as to cause the system to operate in a number of different modes of operation, wherein the system is operable in an active heating mode of operation in which the controller controls the heat pump, the one or more fluid pumps and the valves to provide the system with: a first fluid circuit in which fluid is pumped through the heat exchange panel and a first side of the heat pump, a second fluid circuit in which fluid is pumped through the heat tank and the second side of the heat pump, and transfer by the heat pump of heat energy from the first fluid circuit to the second fluid circuit.

25 Claims, 12 Drawing Sheets

(51) Int. Cl.
*F28F 1/40* (2006.01)
*F28F 3/04* (2006.01)
*F28F 3/12* (2006.01)
*F28F 9/00* (2006.01)
*F28F 9/02* (2006.01)
*F28F 21/08* (2006.01)
*F28F 1/02* (2006.01)
*F28F 1/16* (2006.01)
*F24S 20/67* (2018.01)
*F24S 10/70* (2018.01)
*F24S 40/20* (2018.01)
*F24S 10/90* (2018.01)

(52) U.S. Cl.
CPC ............... *F24S 20/67* (2018.05); *F24S 40/20* (2018.05); *F28D 15/0233* (2013.01); *F28D 15/0275* (2013.01); *F28F 1/022* (2013.01); *F28F 1/16* (2013.01); *F28F 1/40* (2013.01); *F28F 3/048* (2013.01); *F28F 3/12* (2013.01); *F28F 9/002* (2013.01); *F28F 9/02* (2013.01); *F28F 21/084* (2013.01); *F28F 2255/02* (2013.01); *F28F 2255/16* (2013.01); *F28F 2275/14* (2013.01); *Y02B 10/20* (2013.01); *Y02B 10/70* (2013.01); *Y02B 30/125* (2018.05); *Y02E 10/44* (2013.01)

(58) Field of Classification Search
CPC ...... F28F 3/12; F28F 9/002; F28F 9/02; F28F 21/084; F28F 2255/02; F28F 2255/16; F28F 2275/14; F24D 11/0221
See application file for complete search history.

(56) References Cited

FOREIGN PATENT DOCUMENTS

| | | | | |
|---|---|---|---|---|
| GB | 2099980 A | * | 12/1982 | ........... F28D 1/0226 |
| GB | 2099980 A1 | | 12/1982 | |
| GB | 2161917 A1 | | 1/1986 | |
| JP | S60181549 A | | 9/1985 | |
| JP | S60259862 A | | 12/1985 | |
| JP | S613956 A | | 1/1994 | |
| WO | 2010102640 A1 | | 9/2010 | |
| WO | WO 2010102640 A1 | * | 9/2010 | ............. F24D 3/005 |

* cited by examiner

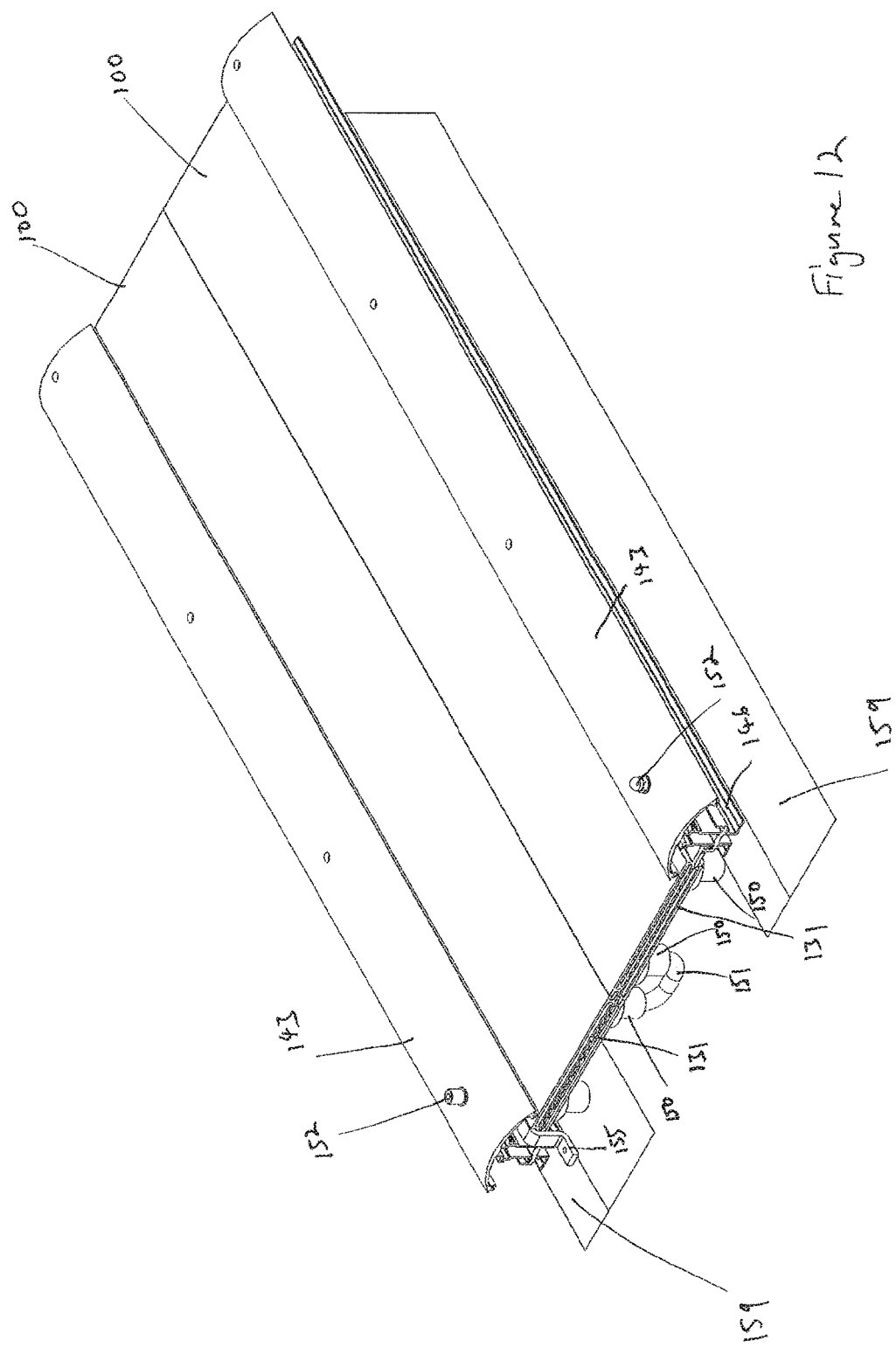

HEATING SYSTEM

CROSS REFERENCE TO RELATED APPLICATIONS

This application is a National Stage of International Application No. PCT/GB2015/051794 filed Jun. 19, 2015, entitled "Heating System," which claims priority to Great Britain Application 1410932.6 filed Jun. 19, 2014, all of which are hereby incorporated by reference in their entirety.

FIELD OF THE INVENTION

The present invention relates to a heating system.

BACKGROUND TO THE INVENTION

Heating and cooling of spaces in buildings such as homes, offices, factories, schools, hospitals etc. is energy intensive and thus expensive. Additionally, such heating and cooling typically consumes energy from fossil fuels or uses renewably-sourced electrical energy that could be used for other purposes.

Heating and cooling requirements can be reduced by using insulation. Some systems use heat pumps to transfer heat energy to or from rivers, aquifers or environmental air.

The invention was made in this context.

SUMMARY OF THE INVENTION

The invention provides a system comprising:
at least one heat exchange panel (700) comprising:
  a main body (100) comprising a sealed cavity in which is provided a fluid in both liquid and gas phases and being configured to communicate heat energy by allowing evaporation of the liquid at one location and condensation of the liquid at a different location in the cavity; and
  at least a first heat exchanger part (130, 131, 110a, 110b, 111a, 111b) including an inlet and an outlet for allowing the passing of fluid through the heat exchanger, the first heat exchanger part being thermally coupled to the heat spreading part so as to communicate heat energy between fluid flowing through the first heat exchanger part and the heat spreading part and thus the environment in which the heat spreading part is present;
a heat pump (222);
a controller (240);
a heat tank (213, 214), for providing a heating fluid for a central heating system or for providing hot water,
plural controllable valves (221-227); and
one or more fluid pumps (261, 217),
wherein the controller is configured to cause control of the pumps and the valves to as to cause the system to operate in a number of different modes of operation, wherein the system is operable in an active heating mode of operation in which the controller controls the heat pump, the one or more fluid pumps and the valves to provide the system with:
  a first fluid circuit in which fluid is pumped through the heat exchange panel and a first side of the heat pump,
  a second fluid circuit in which fluid is pumped through the heat tank and the second side of the heat pump, and
  transfer by the heat pump of heat energy from the first fluid circuit to the second fluid circuit.

The system may be operable in a passive heating mode of operation in which the controller controls the heat pump, the one or more fluid pumps and the valves to provide the system with a fluid circuit in which fluid is pumped through the heat exchange panel and the heat tank and bypasses the heat pump.

The system may be operable in a passive store mode of operation in which the controller controls the heat pump, the one or more fluid pumps and the valves to provide the system with a fluid circuit in which fluid is pumped through the heat exchange panel and a low temperature storage device without operating the heat pump.

The system may include at least first and second heat exchange panels and may be operable in an enhanced passive heating mode of operation in which the controller controls the heat pump, the one or more fluid pumps and the valves:
  in a first phase to provide the system with a third fluid circuit in which fluid is pumped through the first heat exchange panel, but not through the second heat exchange panel, to the heat tank bypassing the heat pump, and
  in a second phase to provide the system with a fourth fluid circuit in which the fluid is pumped through the second heat exchange panel, but not through the first heat exchange panel, to the heat tank bypassing the heat pump.

The at least one heat exchange panel may comprise a second heat exchanger part including an inlet and an outlet for allowing the passing of fluid through the heat exchanger, the second heat exchanger part being thermally coupled to the heat spreading part so as to communicate heat energy from the environment in which the heat spreading part is located to fluid flowing through the second heat exchanger part and the second heat exchanger part may be located at a higher location on the heat exchange panel than the first heat exchanger part.

The system may be operable in a snow clearing mode of operation and/or an active cooling mode of operation in which the controller controls the heat pump, the one or more fluid pumps and the valves to provide the system with:
  a fifth fluid circuit in which fluid is pumped through the second heat exchanger part of the heat exchange panel and a first side of the heat pump,
  a sixth fluid circuit in which fluid is pumped through the heat tank and the second side of the heat pump, and
  transfer by the heat pump of heat energy to the fifth fluid circuit from the sixth fluid circuit.

The system may be operable in a passive snow clearing mode of operation in which the controller controls the heat pump, the one or more fluid pumps and the valves to provide the system with a fluid circuit in which fluid is pumped through the second heat exchanger part of the heat exchange panel and a low temperature storage device without operating the heat pump.

The system may include at least first and second heat exchange panels and may be operable in a thermal transfer mode in which the controller controls the heat pump, the one or more fluid pumps and the valves to take in heat energy from one of the heat exchange panels and to expel heat energy through the other of the heat exchange panels.

The at least one heat exchange panel may be mounted on a roof of a building.

The at least one heat exchange panel may be secured to a building in a weatherproof manner.

BRIEF DESCRIPTION OF THE FIGURES

Embodiments of the invention will now be described, by way of example only, with reference to the accompanying drawings in which:

FIG. 12 is an isometric view of the heat transfer panels of the FIG. 7 system installed on the roof.

DETAILED DESCRIPTION OF SOME EMBODIMENTS OF THE INVENTION

Figure 1:
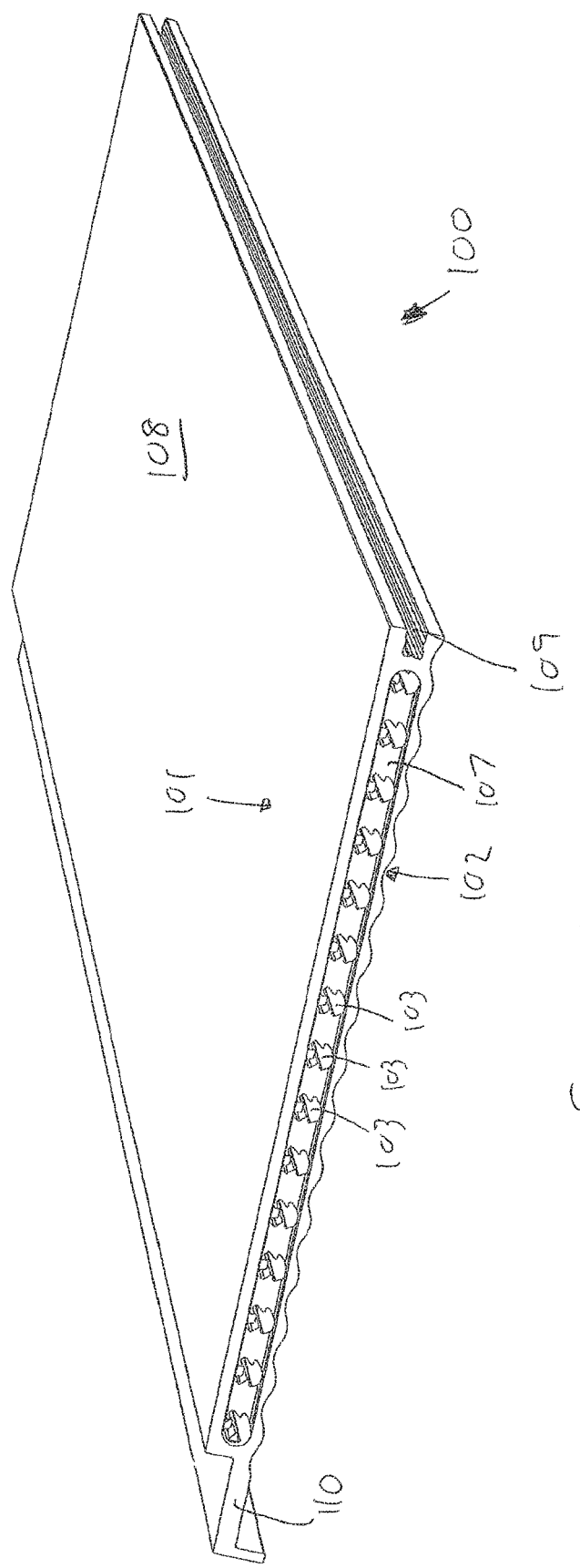
FIG. 1 is an isometric view of part of a heat mat used in systems according to embodiments of the invention.

Referring firstly to FIG. 1, part of a heat mat 100 used with systems according to the invention is shown in isometric view. The heat mat 100 comprises a main body 108 having two main faces, namely an exterior face 101, which is uppermost shown in FIG. 1, and an interior face 102, which is not visible in FIG. 1.

The heat mat 100 is generally rectangular in shape. The heat mat 100 is formed from a suitable material, for instance aluminium.

Extending within the heat mat main body 108 are plural passages 103, ends of which are visible in FIG. 1. The passages 103 are equally spaced across the width of the heat mat 100. The configuration of the passages 103 is described in more detail below, particularly with reference to FIG. 4.

Along one edge of the heat mat main body 108 is provided a connecting slot 109, which can receive a corresponding rib of another heat mat 100 so as to allow the connection of multiple heat mats together. At the edge of the heat mat 100 that is opposite the connecting slot 109 is provided a bracket 110, to allow the heat mat 100 to be connected to a supporting structure or other component.

At the ends of the heat mat main body 108 are provided manifold receiving channels 107, one of which is visible in FIG. 1. The manifold receiving channel 107 takes the form of a recess, trench or channel. The sides of the manifold which is in channel 107 are separated from the end of the exterior face 101 and from the end of the interior face 102 respectively. Ends of the manifold receiving channel 107 are separated from a bottom of the connecting slot 109 and from the bracket 110 respectively. The footprint of the manifold receiving channel 107 includes all of the passages 103 therein. The bottom of the manifold receiving channel 107 is in this example planar and lies in a plane that is generally perpendicular to the main plane of the heat mat main body 108.

The exterior face 101 of the heat mat main body 108 is generally planar, and as is best seen in FIG. 1.

Figure 2:
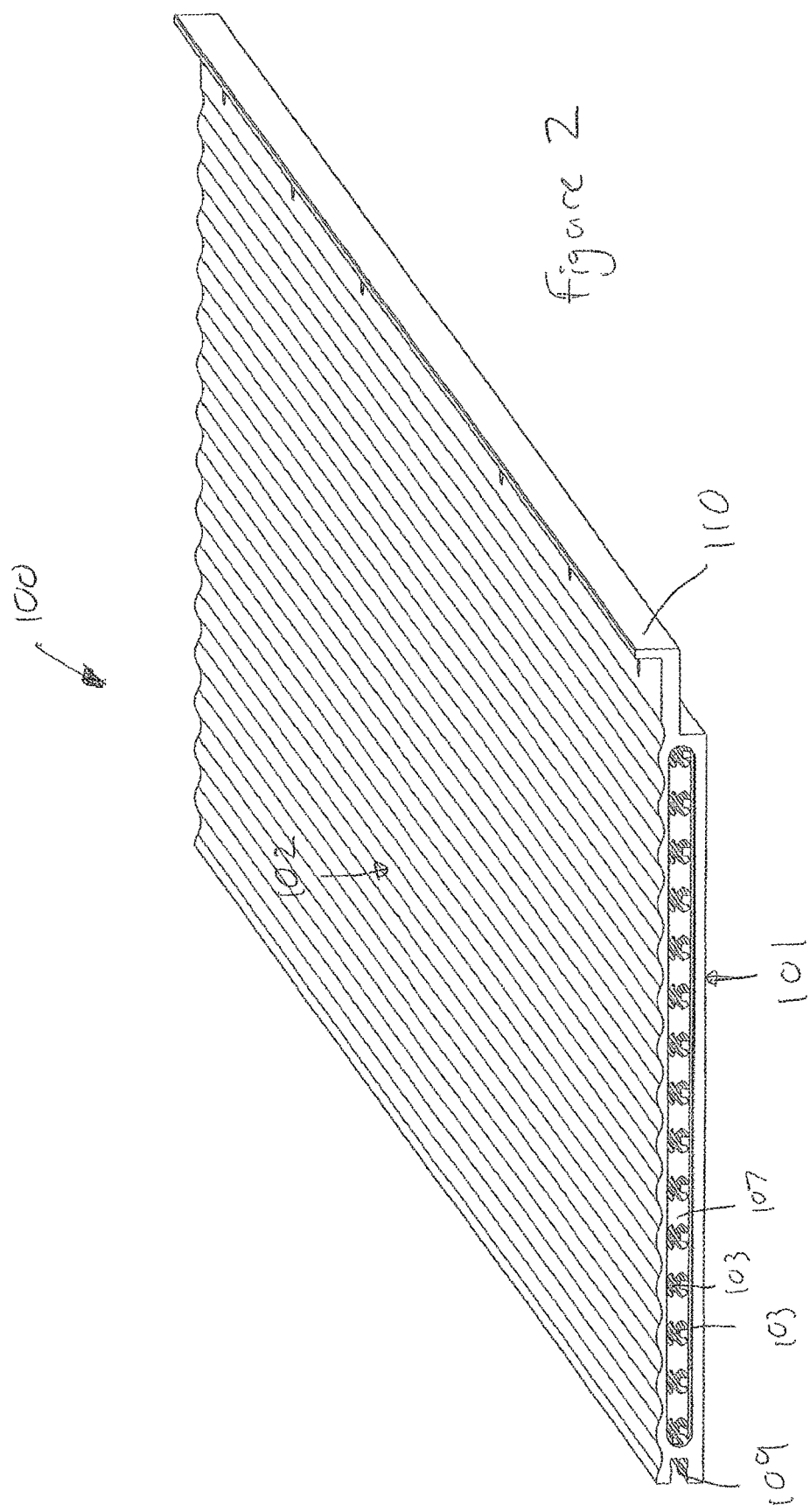
FIG. 2 is an alternative isometric view of the FIG. 1 heat mat, from below with respect to FIG. 1.

As is best seen in FIG. 2, the interior face 102 has an undulating form. The undulations run parallel to the passages 103. The undulations of the interior face 102 extends to the entire length of the heat mat main body 108. As is best seen from FIGS. 3 and 4, the peaks of the undulations of the interior face 102, at which point the heat mat main body 108 has the greatest thickness, coincide with the passages 103. Correspondingly, the troughs of the undulations of the interior face 102, which correspond to the lowest thickness of the heat mat main body 108, correspond to the positions between the passages 103. The undulations are generally sinusoidal. The undulations have rotational symmetry about a point that is midway between a peak and a trough.

FIG. 2 also shows the manifold receiving channel 107 at the opposite end of the heat mat main body 108 to the manifold receiving channel 107 that is shown in FIG. 1. FIG. 2 also shows other details of the profile of the bracket 110.

Figure 3:
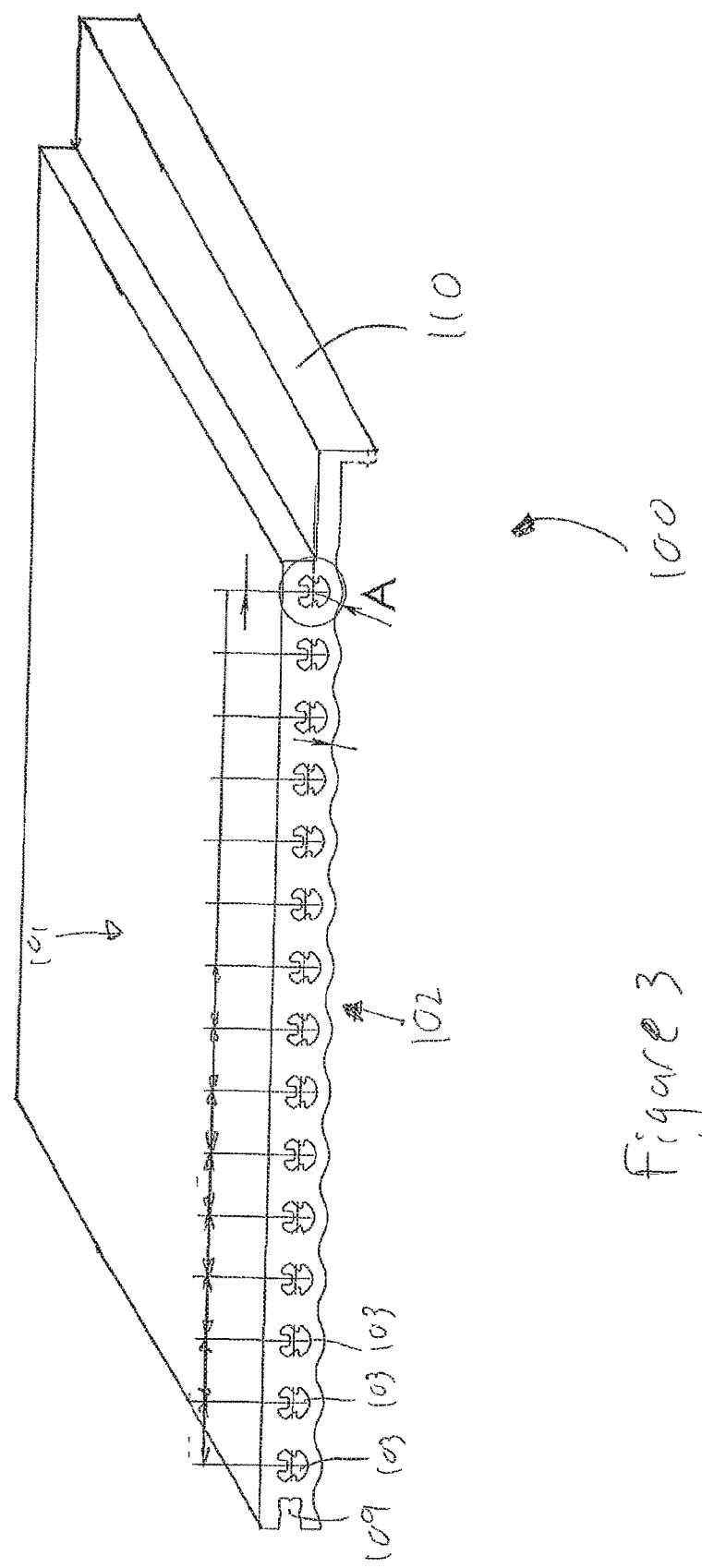
FIG. 3 is a hybrid cross-section of the heat mat of FIGS. 1 and 2.

FIG. 3 is in part a section taken through the heat mat of FIGS. 1 and 2. FIG. 3 shows the profiles of the passages 103 more clearly, in particular because the manifold receiving channel 107 is not shown.

Figure 4:
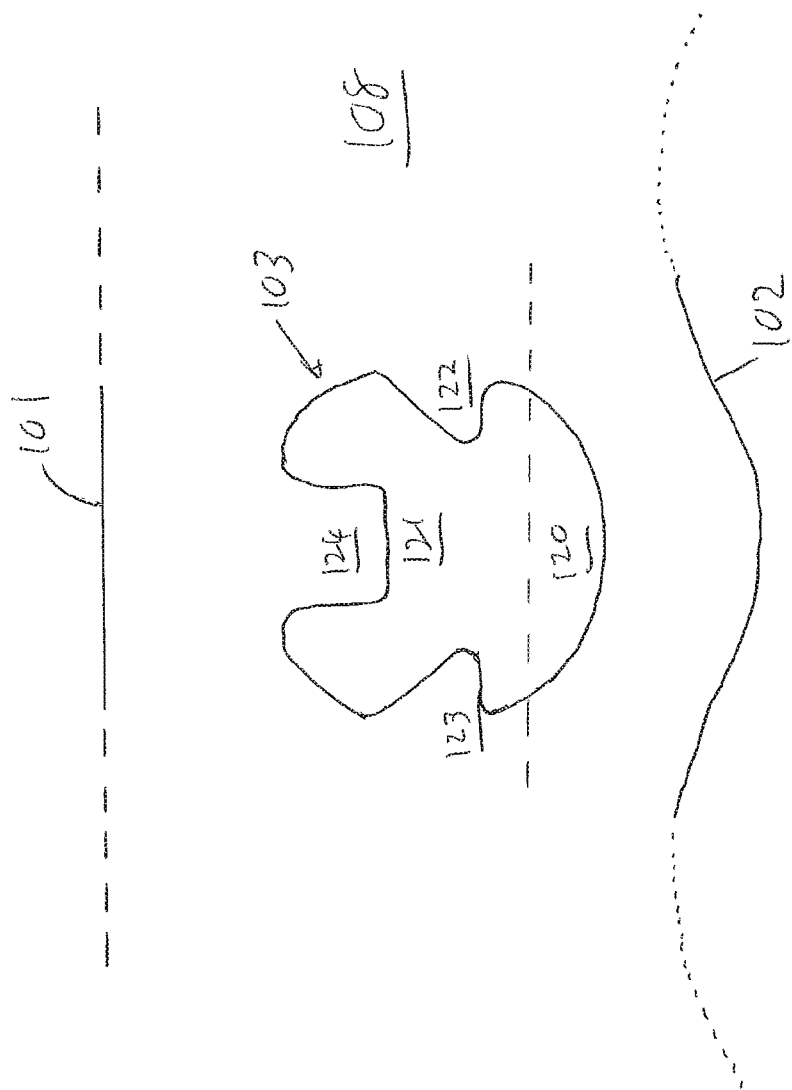
FIG. 4 is an end view of a detail of the FIG. 3 heat mat part.

As can be seen most clearly from FIG. 4, the passage 103 has a generally circular shape and includes a number of features. The passage 103 can be divided conceptually into two parts: a phase-change portion 121 and a drain channel 120. The divider between the drain channel 120 and the phase-change portion 121 is a straight line that is horizontal in FIG. 4. This straight line that divides the drain channel 120 from the phase-change portion 121 is shown as a bass line in FIG. 4. The divider is located approximately one quarter of the distance between the part of the passage 103 that is furthest from the exterior face 101 and the part of the passage 103 that is closest to the exterior face 101. However, the divider could instead be located anywhere between 10% and 50% of the way along the depth of the passage as defined from the part of the passage 103 that is most distant from the exterior face 101 and the part of the passage 103 that is closest to the exterior face 101.

As can be seen in FIG. 4, the drain channel 120 has a regular profile, in particular a part circular profile (it forms a segment of a circle). The phase-change portion 121 however has an irregular profile. In particular, the phase-change portion 121 includes two triangular ribs 122, 123 that extend inwards with respect to the circle forming the general boundary of the passage 103. The phase-change portion 121 also includes a square rib 124, that extends inwardly of the circle forming the general profile of the passage 103.

The effect of the ribs 122, 123, 124 is to provide an increased surface area between the material of the heat mat main body 108 and the cavity that is the passage 103. The surface area of the phase-change portion 121 is greater per unit volume than the surface area of the drain channel 120. Put another way, the ratio of the surface area of the phase-change portion 121 to the volume of the phase-change portion is greater than the ratio of the surface area to volume of the drain channel 120. The triangular ribs have a greater surface area to mass ratio yet are relatively simple to manufacture. The triangular ribs 122, 123 have a greater surface area to mass ratio yet are relatively simple to manufacture. The square rib 124 has a good surface area to mass ratio and is very simple to manufacture reliably. The significance of the ribs is explained below.

The ribs 122, 123, 124 are constructed so as to facilitate straightforward manufacture of the heat mat 100. In particular, corners of the ribs are filleted. Also, the thicknesses of the ribs are sufficiently high that they can be reliably formed through a manufacture without breakage.

The passages 103 have an overall width of approximately 5.5 mm and a cross sectional area of approximately 20 mm$^2$.

Approximately 15% of the area of a circle including the passages is occupied by the volume of the ribs 12-124. The volume of the circle including the passages that is occupied by the volume of the ribs may be for instance 5-35%.

Figure 5:
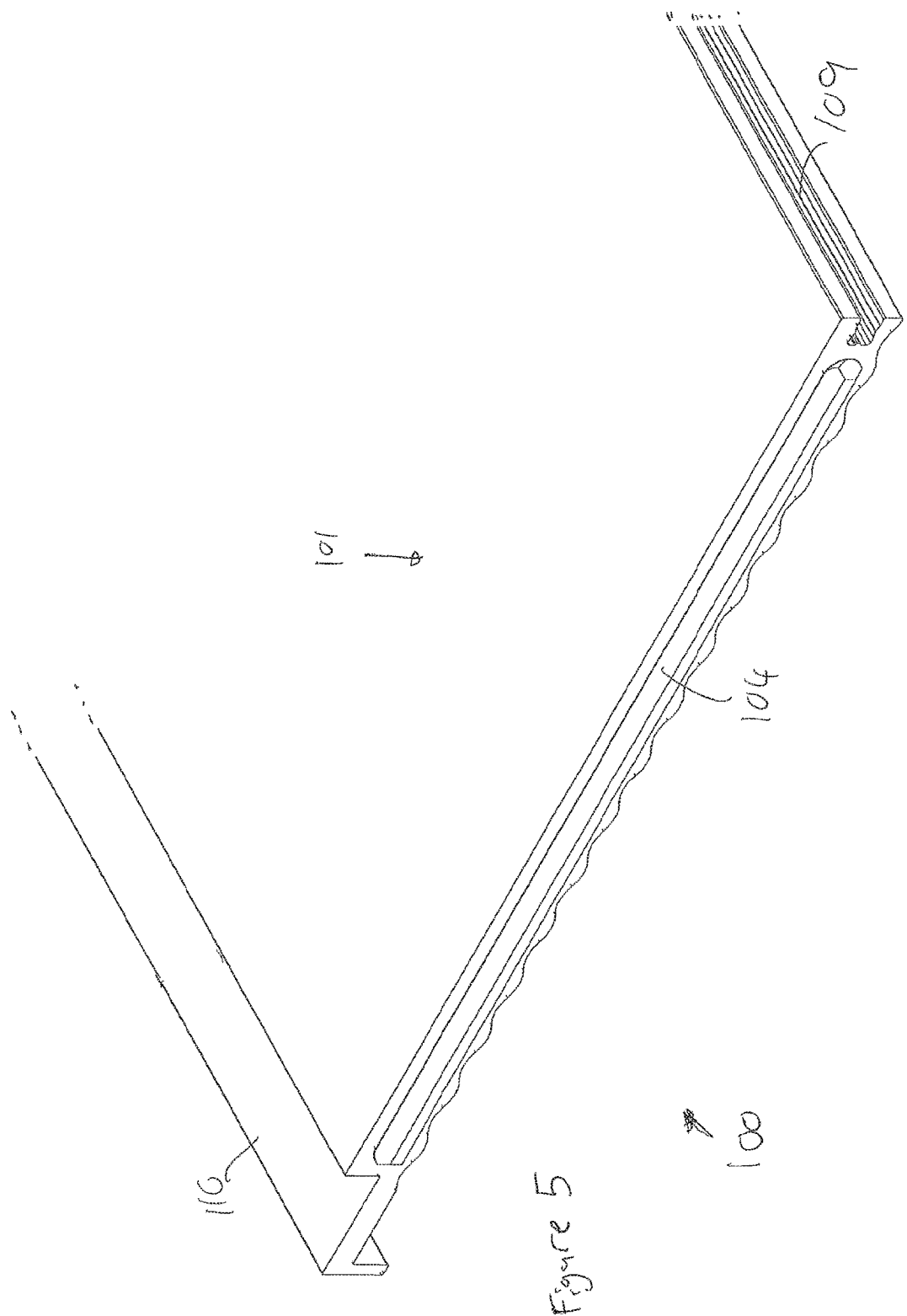
FIG. 5 is a heat mat used in systems according to embodiments of the invention and including the heat mat part of FIG. 1 with a manifold.
Figure 6:
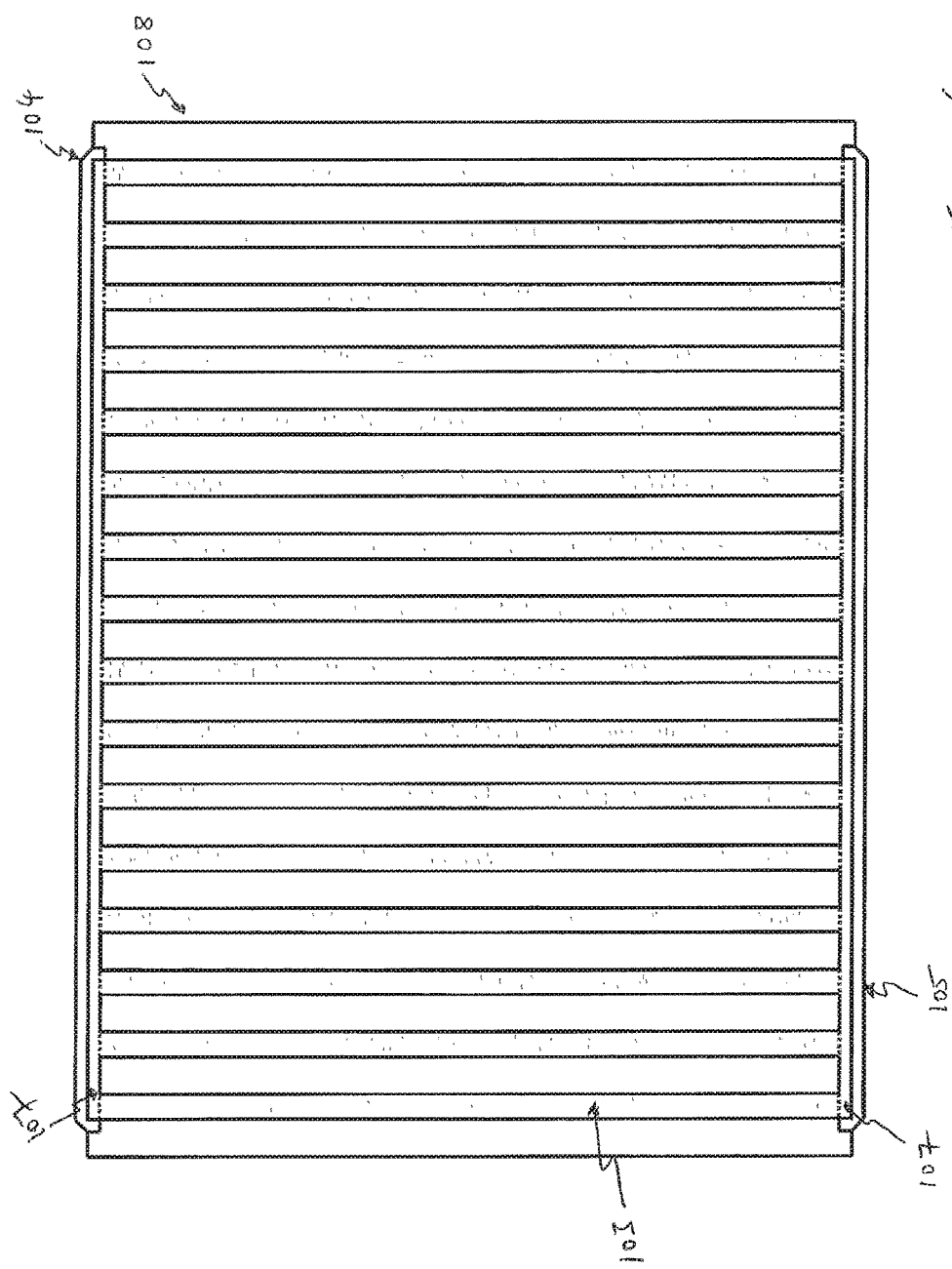
FIG. 6 is a first cross-section through the heat mat.
Figure 7:
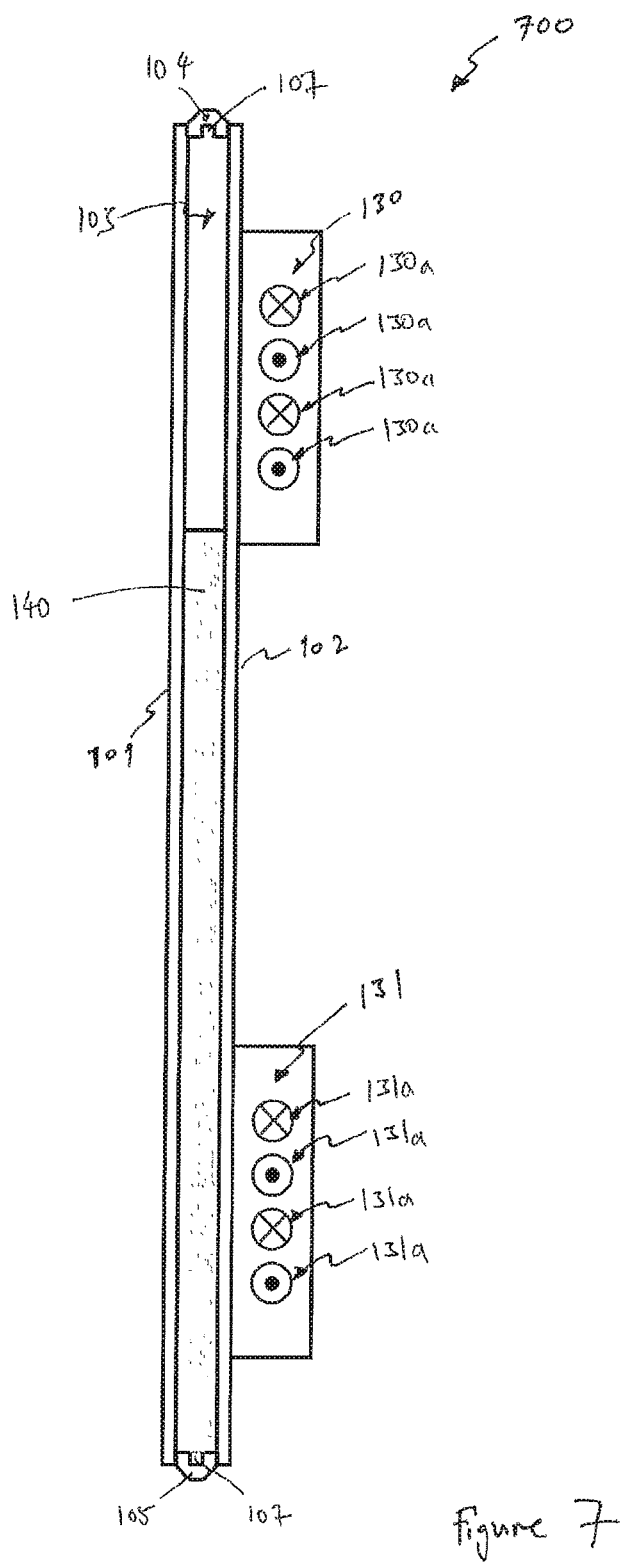
FIG. 7 is a different cross-section through the heat mat, with first and second heat exchange elements fitted.

As is best seen in FIG. 5, one manifold 104, 105 is provided at each end of the heat mat main body 108. FIG. 5 shows an upper manifold 104. The upper manifold 104 is provided within the manifold receiving channel 107. The upper manifold 104 is the same as the lower manifold 105, that is provided at the other end of the heat mat main body 108. Each of the manifolds 104, 105 includes a manifold channel 106, which is best seen in FIG. 6 and FIG. 7. The manifold channel 106 serves to connect the passages 103, to allow fluids to flow between the passages 103. The provision of upper and lower manifolds 104, 105 means that all of the passages 103 are connected together at their upper ends and at their lower ends.

The manifolds 104, 105 are substantially straight. The manifolds 104, 105 are formed of the same material as the heat mat main body 108. The manifold 104, 105 is designed to fit snugly within the manifold receiving channel 107 of the heat mat main body 108. Interference fitting, welding or gluing can be used to embed the manifold onto the heat mat main body 108, in the process forming a sealed chamber within the heat mat 100. The manifold 104, 105 has a substantially straight channel running along the entire length of the inner face (i.e. the face that is facing the open passages 103). The channel has a rectangular cross-section, although it may instead be for instance part-circular for better pressure characteristics. The effect of this channel is to commonly terminate all the passages 103 as shown in FIG. 6, allowing the working fluid to pass through freely and equalising the pressure when the heat mat is in operation. The external surface of the manifold 104 (i.e. the face that is facing outwards of the heat mat 100) has a generally triangular profile. The material of the manifold 104, 105 is of a suitable minimum thickness, for instance 2 mm or 2.5 mm.

The height of the manifold channel 106 may be smaller than the width of the passages 103. The main effect of the manifold channel 106 is to allow pressure to be equalised between the ends of the passages 103. The cross-sectional area of the manifold channel may alternatively be approximately the same as the cross-sectional area of the passages.

The cross sectional area of the manifold cavities may for instance be 50-200% the cross sectional area of the passages The passages 103 within the heat mat main body 108 are commonly terminated at each end of the heat mat main body 108 by the manifolds 104 and 105, sealing the passages 103 which in turns form a liquid- and gas-tight chamber as shown in FIG. 6. The manifolds 104, 105 can be mounted on the heat mat main body 108 by interference fitting or bonding, for example. Advantageously, the mechanical mounting of the manifolds 104, 105 on the heat mat main body 108 also forms the seal.

In use, the heat mat 100 is positioned vertically or at an incline from vertical. This allows gravity to be used to pass liquid from an upper part of the heat mat 100 to a lower part, as is described below.

The interior cavities of the heat mat 100, comprising the passages 103 and the manifold channels 106, are provided with a volume of fluid. In particular, some of the fluid is in liquid phase and some of the fluid is in gas phase. Because the upper and lower manifolds 104 and 105 are sealed within the manifold receiving channels 107 of the heat mat main body 108, the cavity comprising the passages 103 and the manifold channels 106 form a closed pressure system. The pressure within the cavity may be above or below atmospheric pressure, depending on the choice of fluid. As seen in FIG. 7, a reservoir of the liquid phase 140 of the fluid is located at the bottom part of the cavity, and in particular extends part-way up the passages 103, and fluid in the gas phase 141 is at the top of the cavity. Consequently, the manifold channel 106 of the lower manifold 105 is filled with the liquid phase 140 of the fluid and the manifold channel 106 of the upper manifold 104 is filled with the gas phase 141 of the fluid.

A first heat exchange element 130 is fitted to the interior face 102 of the heat mat 100. In particular, the first heat exchange element is located at an upper portion of the heat mat 100. In this particular example, all of the functional part of the first heat exchange element is located more than half-way up the height of the heat mat 100.

Within the first heat exchange elements there are provided one or more conduits 130a. The conduits extend perpendicularly to the cross-section of FIG. 7, and two out and two return portions are illustrated in the figure with the use of a cross and a dot respectively in the conventional way.

A second heat exchange element 131 is provided on the interior face 102 of the heat mat 100. The second heat exchange element 131 is provided at a lower portion of the heat mat 100. In this example, all of the functional part of the second heat exchange element is formed below the half-way point of the heat mat 100.

The second heat exchange element 131 includes conduits 131a, which have the same form in this example as the conduits 130a of the first heat exchange element 130.

The heat exchanger elements 130, 131 are sized such that an area of coupling between the heat exchanger element 130, 131 and the heat mat constitutes 5-40% of the area of the interior surface 102 of the heat mat 100. In these examples, the heat exchanger elements 130, 131 have one undulating surface all or almost all of which is in thermal contact with the heat mat 100.

The heat mat 100 may for instance be extruded, fabricated cast, pressed or manufactured in a combination of these methods. The heat exchanging elements 130, 131 can be held against the heat mat 100 using mechanical fixings e.g. bolts, screws, clamps etc bonded with adhesives, welded or affixed in any other way which allows good mechanical contact for thermal transfer.

Contained within the sealed chamber is a working fluid that is fundamental to the heat exchanging process. There are a multitude of working fluid that can be used including water, ammonia, acetone, alcohols and blends thereof, the efficacy of these are driven by the conditions in which the panel is used. The skilled person will be able to identify suitable fluids for any given set of working conditions.

Referring to FIG. 7, a heat exchange panel 700 capable of absorbing and/or emitting thermal energy is shown. The heat exchange panel 700 comprises the heat mat 100 and either or both of the heat exchange elements 130, 131. The heat exchange elements 130, 131 are connected either directly or indirectly to with a second liquid (or gas) passing through them to remove or deliver energy as required. The heat exchange elements 130, 131 illustrate an application of the heat mat 100, although other applications will be apparent.

The heat exchange panel 700 illustrated in FIG. 7 may be used as either a heat energy collector or a heat energy emitter using the exterior surface 101. This is facilitated by the mounting of the two heat exchange elements 130, 131 to the heat mat main body 108. Only one of the heat exchange elements 130, 131 is used for each mode of operation of the system.

Each heat exchange element 130, 131 has a surface with an undulating profile, corresponding to the interior surface 102 of the heat mat main body 108, for maximising the transfer of heat energy from the heat mat to the heat exchange element 130, 131. This undulating surface forms a close fit with the undulating surface 102 of the heat mat main body 108. The interior surface 102 of the heat mat main body 108 is thermally coupled to the heat exchange elements 130, 131 using a thermal paste or gel. Each heat exchange element 130, 131 is then mechanically clamped onto the heat mat main body 108. For a permanent coupling, thermal adhesive may instead be used.

In order to use the heat exchange panel 700 as a heat energy absorber, liquid or vapour at a temperature that is at least a few Kelvin lower than the heat mat main body 108 is passed through the upper, first heat exchange element 130. As the exterior surface 101 is heated by an external heat source, typically, latent heat from the mass of the ambient air and/or solar energy absorption, the heat energy is transferred into the fluid through the ribs 122, 123, 124 of the phase-change portion 121 of the passages 103. The heat energy evaporates the working fluid, turning it from liquid to vapour through the absorption of latent heat of evaporation. This evaporation thus uses more heat energy than does heating without phase change. The heated vapour rises along the passages 103, mostly along the volume contained by the phase change portion 121, and condenses on the inner surface of the upper manifold 104 and/or the surface of the drain channel 120 of the passage 103. Upon condensing, the vapour releases the stored latent heat to the material of the heat mat main body 108 that is adjacent the drain channel 120 or the upper manifold 104. This heat energy is then transferred to the first heat exchange element 130 through conduction by the material of the heat mat main body 108 and/or the upper manifold 104. The condensed liquid travels down the drain channel 120, typically flowing along the internal surface of the passage 103, by the action of gravity. The liquid then collects at the bottom of the heat mat 100 in the reservoir of liquid phase fluid 140. The vaporization-condensation cycle can then repeat again. This effect causes the heat energy to be distributed substantially evenly across the entire exterior surface 101 of the heat mat main body 108, and prevents any significant temperature difference between the upper and lower parts of the heat mat 100. The upper and lower manifolds 104, 105 allow the communication of fluid laterally in the panel, and prevent any significant temperature difference between different locations along the width of the heat mat 100. Put another way, the heat mat 100 is approximately isothermal on each surface 101, 102, although there typically is a modest temperature difference between the exterior surface 101 and the interior surface 102. It also causes the efficient transfer of heat energy from the exterior surface 101 to the interior surface 102. The amount of heat energy that is transferred is significantly greater than can be achieved through conduction by an inexpensive metal of comparable weight and size to the heat mat 100. This is achieved without the use of any wicking structure or material.

In order to use the heat exchange panel 700 i.e. as a heat energy emitter, liquid or gas that is at a temperature least a few Kelvin higher than the heat mat main body 108 is is passed through the lower, second heat exchange element 131. In this mode of operation, the heat energy is conducted through the interior surface 102 to the passages 103. This causes the working fluid in the cavity to change phase from liquid to vapour. The heated vapour travels up the passages 103 and condenses on the cooler ribs 122, 123, 124 of the phase-change portion 121 of the passages 103 and/or on the inner surfaces of the upper manifold 104. This releases the heat energy stored in the vapour into the material of the heat mat 100. This heat energy is then conducted to the (cooler) exterior surface 101. The condensed liquid then travels to the bottom of the cavity in the heat mat main body 108 under the influence of gravity and the vaporization-condensation cycle repeats again. The condensed fluid flows down the passages 103 in a manner that depends on the configuration of the passages 103 and the orientation of the heat mat 100, and may flow down the drain channel 120. However the condensed fluid flows, it does not significantly impede the flow of gas phase fluid up the passages 103. Experiments have shown that the heat mat 100 is almost as effective in this heat energy emitting mode of operation as it is in the heat energy absorbing mode of operation, and is significantly more effective than a corresponding arrangement in which circular profile passages are used. The better efficiency of heat transfer results from the configuration of the passages 103.

The effect of the ribs 122, 123, 124 is to provide an increased surface area between the material of the heat mat main body 108 and part of the cavity that is the phase change portion of the passage 103. This improves the phase-change process as more heat can flow between the exterior surface 101 and the working fluid within the sealed chamber per unit time, compared to an arrangement that is absent of ribs. The surface area of the phase-change portion 121 is greater per unit volume than the surface area of the drain channel 120. The profile of the passages is not limited to that shown in FIG. 4. For example, the main rib 124 can be narrower (whilst having the minimum width needed for mechanical stability and manufacturability). Optionally, one or more additional ribs could be provided in place. Similarly, the ribs 122 and 123 can also be narrower. The ribs may be of any suitable profile, for instance rectangular, square, triangular or convex rounded. They may alternatively have a more complex profile, such as a part-trefoil or part-clover-leaf profile. The features 122, 123 and 124 are ribs because they extend longitudinally along the length of the passages 103. If manufacturing allows, other internal features of the passages that change the surface area of the phase change portion may be used instead of ribs.

Because of the configuration of the heat mat 100, heat energy is readily exchanged between the exterior faces 101 and 102 of the heat mat 100 and the fluid within the passages 103. Heat transfer is a function of the thermal conductivity of the material used for the heat mat main body 108, but it is also a function of the profile of the passages and the relationship between them and the profiles of the interior and exterior surfaces 101, 102. For instance, the matching between the undulating profile of the interior surface 102 and the rounded profile of the drain channel 120 maximises thermal conduction therebetween whilst allowing a minimum wall thickness (e.g. 2 mm or 2.5 mm) to be maintained and whilst allowing the drain channel to have a shape that provides effective draining of the condensed liquid down the heat mat to the reservoir of liquid phase fluid 140. It also allows the quantity of material used in the main body 108 to be reduced for a given minimum wall thickness. The profile of the phase change portion 121 of the passages 103 maximises the transfer of heat energy from the exterior surface 101 to the passages whilst allowing the exterior surface 101 to be planar, whilst allowing a minimum wall thickness (e.g. 2 mm or 2.5 mm) to be maintained and whilst allowing relatively straightforward manufacture of the heat mat main body 108.

The formation of the passages 103 within the heat mat main body 108 and the use of the manifolds 104, 105 facilitates relatively straightforward sealing of the cavity including the passages 103 since only a single seal at each end of the passages 103 with the heat mat main body 108 is required. Furthermore, the arrangement of the heat mat 100 is very simple. The compact and self-contained nature of the heat mat 100 also gives rise to improved resilience to externally applied forces and thus makes it less vulnerable to being damaged. This allows it to be used as a material in construction of a residence or other building.

A prototype has been constructed and tested. The prototype heat mat, manufactured from aluminium, had dimensions of 4000×180×10 mm and the working fluid used was ammonia.

The tests were undertaken using a purpose built enclosed insulated chamber. A heat exchanger covering approximately ten percent of the area of the heat mat, with a circulating water pipe circuit feeding a water tank, was thermally bonded and mounted to the sample heat mat for heat extraction. The heat exchanger was used to transfer heat energy into a water tank using a circulating water pipe circuit. The air in the chamber was not stirred during the tests.

The tests identified that, with a 13 K temperature differential between the heat mat working temperature and the circulating water inlet temperature, the prototype heat mat achieved a heat transfer rate of 1.47 kW/m$^2$. This rate of heat transfer is considerably higher than can be achieved with the majority of prior art arrangements.

Various alternatives to the exchange panel 700 will be apparent to the skilled person as being within the scope of the appended claims. Some such alternatives will now be described.

The exterior surface 101 may have fins extending from it, which increases the heat emitting surface area and improves the rate of heat transfer.

The ribs 122-124 are easy to manufacture by extrusion because they have a constant profile along the length of the passages 103. Instead, protrusions of other forms may be present in the passages. The protrusions may be domed, or they may be circumferential or helical ribs or may take any other suitable form, as permitted by the manufacturing process chosen for producing the heat mat body 108.

In other embodiments, the passages 103 have a circular or oval profile and are absent of ribs or other protrusions.

The heat mat 100 may be provided with a pressure relief valve that is operable to release some fluid when the internal pressure exceeds a threshold level. This provides improved safety since it reduces the risk of an uncontrolled rupture of the material of the heat mat 100.

The main body 108 and the manifolds 104, 105 advantageously are formed of aluminium, which is relatively inexpensive, has good anti-corrosion properties, and is easy to work in a manufacturing process. Alternatively, an aluminium alloy or another metal such as steel may be used.

Instead of the first and second heat exchange elements 130, 131 being external to the heat mat 100, either or both of the first and second heat exchange elements 130, 131 can be provided internally within the heat mat. In this case, a cavity is provided at the appropriate end of the heat mat 100, for instance in the form of an enlarged manifold 104, 105, and the heat exchange element 130, 131 extends into the heat mat 100 and through the cavity so as to allow the transfer of heat energy from the fluid in the heat mat 100 to the fluid passing through the heat exchange element 130, 131. Alternatively, a heat exchange arrangement like that shown in the prior art FIG. 9 may be suitable (although without the duct 902). Such arrangements require sealing where conduits of the heat exchange element 130, 131 enter the heat mat 100 and may not allow straightforward removal of the heat mat 100 from the heat exchange elements 130, 131.

Figure 8:
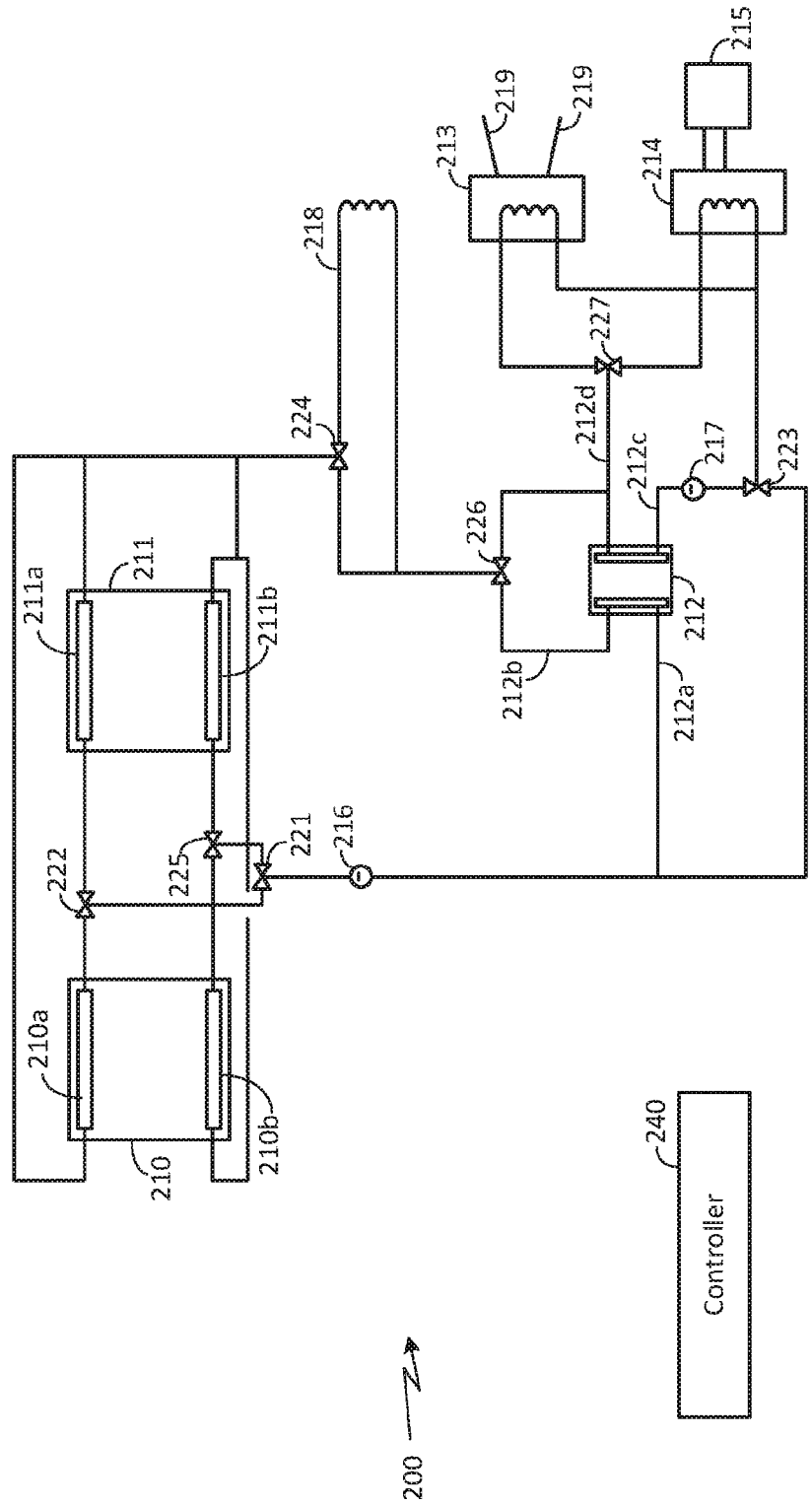
FIG. 8 is a schematic diagram of a system according to embodiments of the invention.

A system 200 according to embodiments of the invention will now be described with reference to FIG. 8.

The system 200 includes one or more heat transfer panels in the form of a first heat transfer panel 210 and a second heat transfer panel 212. The first heat transfer panel 210 may for instance be located on a north facing part of a roof, and the second heat transfer panel 211 may be located on the south facing part of the roof.

The first heat transfer panel 210 includes upper and lower heat exchange elements 210*a*, 210*b*, which are located at the top and the bottom of the panel 210 respectively. The second heat transfer panel 212 similarly includes upper and lower heat exchange elements 211*a*, 211*b*, which are located at the top and the bottom of the panel 211 respectively. The upper heat exchange elements 210*a*, 211*a* are used for extracting heat energy from the environment and the lower heat exchange elements 210*b*, 211*b* are used to communicate heat energy to the environment. Each of the heat exchange elements 210*a*, 210*b*, 211*a*, 211*b* of the heat exchange panels 210, 211 has at least one inlet and at least one outlet. However, the heat exchange elements 210*a*, 210*b*, 211*a*, 211*b* are non-directional and can be used in either direction.

The heat transfer panels 210, 211 may be constituted by the heat exchange panel 700 of FIG. 7, including the heat mat 100. The upper heat exchange elements 210*a*, 211*a* may be the same as the heat exchange part 130 of FIG. 7 and the lower heat exchange elements 210*b*, 211*b* may be the same as the heat exchange part 131 of FIG. 7. The heat mat 100 serves as a heat spreading part.

The system 200 also includes a heat pump 212, a hot water tank 213 and a heating/cooling tank 214. Also included in the system 200 is a low temperature storage 218. First and second pumps 216, 217 are operable under control of a controller 240 to pump fluid around circuits including various components of the system 200.

Fluid circuits are created by the connection of the components 210 to 214 and 216 to 219 by fluid, carrying conduits, such as pipes, and first to seventh valves 221 to 227. The valves 221 to 227 are controllable via the controller 240 to allow or restrict flow between various combinations of inlets and outlets of the valves, so as to set up required fluid circuits. The fluid circuits so created may be relatively high pressure circuits. The fluid may for instance be a mixture of water and glycol.

In this example, each of the valves 221 to 227 includes three inlets/outlets. Some of the valves 221 to 227 are able to switch between connecting between one inlets/outlet and one of the other two inlets/outlets exclusively. Others of the valves 221 to 227 are able to connect one inlets/outlet to one of the other two inlets/outlets exclusively or to connect all three together, under control of the controller 240.

Inlets of the heat exchange elements 210*a*, 210*b*, 211*a*, 211*b* of the heat exchange panels 210, 211 are commonly connected. Outlets of the heat exchange elements 210*a*, 210*b*, 211*a*, 211*b* are connected to different inlet/outlets of a valve system formed by first, second and fifth valves 221, 222, 225. In particular, the outlet of the upper heat exchange element 210*a* of the first heat exchange panel 210 and the outlet of the upper heat exchange element 211*a* of the second heat exchange panel 210 are coupled to different inlet/outlets of the second valve 222. Also, the outlet of the lower heat exchange element 210b of the second heat exchange panel 210 and the outlet of the lower heat exchange element 211b of the second heat exchange panel 210 are coupled to different inlet/outlets of the fifth valve 225. The other inlet/outlet of the first and second valves 221, 222 are coupled to different inlet/outlets of the first valve 221. The valves 221, 222 and 225 are configured so as to allow the controller 240 to cause the flow of fluid through the either or both of the upper heat exchange elements 210a, 211a, or through either or both lower heat exchange elements 210b, 211b, but not through both upper and lower heat exchange elements 210a, 210b, 211a, 211b at the same time.

The heat pump 212 includes first and second sides. The first side of the heat pump 212 has an inlet 212a and an outlet 212b. The second side of heat pump 212 has an inlet 212c and an outlet 212b. Fluid is unable to flow with the heat pump 212 from the first side to the second side, or in the opposite direction. Instead, fluid can only flow through the first side or through the second side.

The first side inlet 212a of the heat pump 212 is connected to the first valve 221, which is connected to inlets of the heat exchange elements 210a, 210b, 211a, 211b of the heat exchange panels 210, 211, via the first pump 216.

A first side outlet 212b of the heat pump is coupled 227 via the sixth valve 226 and the fourth valve 224 to the commonly-coupled inlets of the heat exchange elements 210a, 210b, 211a, 211b of the heat exchange panels 210, 211.

Thus, one possible fluid circuit is provided from the heat exchange elements 210a, 210b, 211a, 211b through the fourth and sixth valves 224, 226, through the first side of the heat pump 212, pumped through the fluid pump 216 and through two of the first, second and fifth vales 221, 222, 225 back to the heat exchange elements 210a, 210b, 211a, 211b. This circuit is provided by the controller 240 by suitable control of the sixth valve 226 and the fourth valve 224. The heat exchange elements 210a, 210b, 211a, 211b that are included in the fluid circuit are set by the controller 240 exerting suitable control of the first, second and fifth vales 221, 222, 225.

Fluid can flow to the first side outlet 212b of the heat pump 212 directly from the heat exchange elements 210a, 210b, 211a, 211b by the controller 240 controlling the fourth valve 224 to bypass the low temperature storage 218. Alternatively, the controller 240 can cause the fluid to flow through the low temperature storage 218 by controlling the fourth valve 224 to close the bypass route.

Further alternatively, the controller 240 can cause fluids to flow between the heat panels 210, 211 and either or both of the hot water tank 213 and heating/cooling tank 214, as will now be described.

The third valve 223 has one inlet/outlet commonly coupled directly to one end of a first element of the hot water tank 213 and to one end of a first element of the heating/cooling tank 214. Another inlet/outlet is connected to the first pump 216 and the last is connected to the second side inlet 212C of the heat pump 212 by the second pump 217. The third valve 223 is switchable to connect the hot water tank 213 and/or the heating/cooling tank 214 either to the first pump 216 (bypassing the heat pump 212) or to the second side of the heat pump 212.

The other end of the first element of the hot water tank 213 and the other end of the element of the heating/cooling tank 214 are coupled to different inlet/outlets of the seventh valve 227. Control of the seventh valve 227 allows fluid to flow through the hot water tank 213 only, the heating/cooling tank 214 only, or both simultaneously.

The final inlet/outlet of the seventh valve 227 is commonly connected to the second side outlet 212d of the heat pump 212 and to an inlet/outlet of the sixth valve 226.

Thus, the controller 240 may cause the flow of fluid from the heat transfer panels 210, 211, through the first pump 216, through either the hot water tank 213 or the heating/cooling tank 214 (by-passing the heat pump 212) and back to the heat transfer panels 210, 211. As is explained below, this circuit is used for passive heating of the hot water tank 213 or the heating/cooling tank 214.

The connection of the second side inlet 212c of the heat pump 212 to the third valve 223 and the connection of the second side outlet 212d of the heat pump 212 to the seventh valve 227 allows the controller 240 to control the system 200 to provide a fluid circuit with the second side of the heat pump 212 and through the hot water tank 213 and/or the heating/cooling tank 214. The fluid is caused to flow by the presence of the second pump 217 in the circuit, which in this example is between the second side inlet 212c of the heat pump 212 and the third valve 223. As is explained below, this circuit is used in operation of the system 200 to provide active heating of the hot water tank 213 and/or the heating/cooling tank 214.

Underfloor heating or radiator elements 215 are coupled in a secondary circuit of the heating/cooling tank 214. The underfloor heating or radiator elements 215 are configured to provide heating or cooling of a volume within the building, for the comfort of persons within the building.

Hot water system inlets/outlets 219 are provided in connection with the hot water tank 213. This allows hot water to be provided, for instance for provision to hot water taps within the building and/or for provision to a washing machine, dishwasher or other appliance that can benefit from a hot water supply.

As briefly mentioned above, the system 200 is operable in many different modes of operation through suitable control of the first and second pumps 216, 217 and the first to seventh valves 221 to 227. Some key modes of operation will now be described.

In an active heating mode of operation, heat energy is extracted from the environment surrounding the heat transfer panels 210, 211 and supplied by the heat transfer panels to the fluid flowing through the heat exchange elements 210b, 211b, and from there is provided to the underfloor heating or radiator elements 215. In the active heating mode of operation, the heat pump 212 is used to release heat energy from a fluid circuit that is provided on the first side of the heat pump 212 and provide the heat energy to fluid that is in a fluid circuit including the second side of the heat pump 212.

In particular, the controller 240 controls the first, fourth and sixth valves 221, 224,126 to direct fluid through the first side of the heat pump 212 (bypassing the low temperature store 218) and to prevent the flow of fluid bypassing the heat pump 212. The fluid is caused to flow in the circuit including the first side of the heat pump 212 by the first pump 216. The controller 240 also controls the third and seventh valves 223, 227 to direct fluid through the second side of the heat pump 212. Depending on whether heating of the hot water tank 223 or the heating/cooling tank 214 is required, the controller 240 controls the seventh valve 227 to direct fluid through that appropriate tank 213, 214. This results in a closed fluid system including either the hot water tank 213 or the heating/cooling tank 214 and the second side of the heat pump 212. The fluid is caused to flow in this circuit by the second pump 217.

In the active heating mode, the heat pump 212 is energised so as to transfer heat from the circuit including the first side of the heat pump 212 to the circuit including the second side of the heat pump 212. This causes cooling of the fluid in the circuit between the first side inlet 212a and the first side outlet 212b. Typically, the temperature of the fluid that is provided at the outlet side of the heat exchange elements 210b, 211b of the heat transfer panels 210, 211 is a little lower than the ambient temperature of the environment to which the heat transfer panels 210, 211 are exposed. However, if solar energy is incident on either or both of the heat transfer panels 210, 211, this results in additional heating of the fluid at the outlet side of the heat transfer panels. Whether or not solar heating occurs, heat energy is absorbed over a large proportion of the area of the heat transfer panels because of the isothermal nature of the panels, which results from the evaporation and condensation cycle described above, and because the heat energy is efficiently removed by the heat exchange elements 210b, 211b.

The operation of the heat pump 212 causes a reduction in the temperature of the fluid as it passes between the first side inlet 212a and the first side outlet 212C. As such, the fluid entering the inlet side of the heat exchange elements 210b, 211b of the heat transfer panels 210, 211 is at a significantly lower temperature than the environment to which the heat transfer panels are exposed. This allows greater opportunity for the fluid in the circuit to be heated by the heat transfer panels 210, 211 using heat energy from the environment. The amount of heat energy that is transferred into the fluid is dependent on the temperature differential between the fluid and the ambient temperature. The colder the fluid that enters at the inlet side of the heat transfer panels 210, 211, the greater the amount of heat energy that is provided to the fluid (per unit time) as it passes through the heat transfer panels.

On the second side of the heat pump 212, the fluid in the circuit is heated as it flows between the second side inlet 212C and the second side outlet 212d. The heat energy comes from the heat energy that is transferred from the fluid in the first side of the heat pump 212. The heated fluid then passes into the hot water tank 210 or the heating/cooling tank 214, where it causes heating of a secondary fluid therewithin. As such, the fluid leaving the hot water tank 213 or the heating/cooling tank 214 is cooler than the fluid entering it. This results in the fluid entering the second side inlet 212C being cooler again, which facilitates the provision of more heat energy to the fluid via the heat pump 212.

It will be appreciated from the above explanation that, in the active heating mode, heat energy from the environment is provided to the secondary fluid in the hot water tank 213 or the heating/cooling tank 214 without any additional heating being provided. There is energy consumption of the system 200 in this mode of operation, in particular from action of the heat pump 212 and from the use of the first and second pumps 216, 217 to pump the fluids in the circuits through the heat pump 212. However, typically the amount of energy required to heat the secondary fluid in the hot water tank 213 or the heating/cooling tank 214 is significantly less than would be the case if the energy was used for directly heating the fluid.

In the active heating mode, the controller 240 may use information received from temperature sensors in the hot water tank 213 and the heating/cooling tank 214 in order to ensure that an appropriate temperature of the secondary fluid is reached. If a threshold temperature is exceeded, the system 200 can be controlled to stop providing heat to the hot water tank 213 or the heating/cooling tank 214, or at least reduce the rate at which heat is provided. Such controlling involves control by the controller 240 of the heat pump 212.

An active cooling mode of operation will now be described. In the active cooling mode of operation, the controller 240 controls the first, second and fifth valves 221, 222, 225 to divert fluid through the uppermost heat exchange elements 210a and 211a so that they can transfer heat energy to the heat transfer panels 210, 211. Additionally, the controller 240 controls the various pumps and valves in the same way as in the active heating mode described above. However, the heat pump 212 is controlled to transfer heat energy from the second side of the heat pump to the first side of the heat pump. Additionally, the seventh valve 227 is controlled to include the heating/cooling tank 214 in the circuit with the second side of the heat pump 212 and to switch out the hot water tank 213 from the fluid circuit.

Control of the heat pump 212 to transfer heat energy from the second side of the heat pump to the first side of the heat pump causes cooling of the secondary fluid in the heating/cooling tank 214. This allows cooler fluid to be transferred to the underfloor heating/radiator elements 215, which thereby causes cooling of the volume within the building.

In the fluid circuit included in the first side of the heat pump 212, the fluid arriving at the inlet side of the lower heat exchange elements 210a, 211a of the heat transfer panels 210, 211 is hotter than the ambient temperature. This causes heat energy to be expended through the heat transfer panels 210, 211 to the environment surrounding the heat transfer panels. Thus, the fluid leaving the outlet side of the lower heat exchange elements 210a, 211a of the heat transfer panels 210, 211 is cooler, and then is heated again by the action of the heat pump 212 as it passes between the first side inlet 212a and the first side outlet 212b, before being cooled again by the lower heat exchange elements 210a, 211a of the heat transfer panels 210, 211. Heat energy is emitted over a large proportion of the area of the heat transfer panels 210, 211 because of the isothermal nature of the heat mat 100, which results from the evaporation and condensation cycle described above, and because the heat energy is efficiently removed from the heat exchange elements 210a, 211a by the heat mat 100.

A passive store mode of operation will now be described. In this mode of operation, the second side of the heat pump 212 is not used. Additionally, the hot water tank 213 and the heating/cooling tank 214 also are not used. In the passive store mode of operation, the controller 240 controls the first and fifth valves 221, 225 to provide a fluid circuit through the upper heat exchange elements 210b, 211b of the heat transfer panel 210 and 211 and the first side of the heat pump 212 and without providing any fluid circuit to or from the third and seventh valves 223, 227. In the passage store mode of operation, the fourth valve, 224 is controlled by the controller 240 to pass the fluid in the circuit through the low temperature storage 218 and not to bypass it.

In the passive store mode of operation, the operation is dependent on the effective ambient temperature of the environment in which the heat transfer panels 210, 211 are provided being at least a few degrees Kelvin higher than a temperature of the low temperature storage 218. The controller 240 controls the pump 216 to pump fluid from the low temperature storage 218 to the inlet side of the upper heat exchange elements 210b, 211b of the heat transfer panels 210, 211. This results in heating of the fluid to a temperature that is closer to the ambient temperature of the environment, and the warmer fluid is then passed through the first side of the heat pump 212 (which is inactive) to the low temperature storage 218. As the fluid passes through the low temperature storage, heat energy is transferred to the secondary material of the low temperature storage 218, which results in the fluid exiting being cooler then the fluid entering.

This thus causes the secondary material in the low temperature storage 218 to be heated with heat energy from the environment contacting the heat transfer panels 210, 211. Moreover this is achieved without any active heating; the only heat energy input into the system is heat energy from the environment surrounding the heat transfer panels 210, 211 the heat energy stored in the low temperature storage 218 can be used in any suitable way, for instance to heat the secondary fluid in the hot water tank 213 and/or the heating cooling tank 214.

In an alternative passive store mode of operation, instead of using the low temperature storage 218 to store heat, the heating/cooling tank 214 can be used instead. In this mode of operation, the heat pump 212 is not used. The controller 240 causes fluid to flow through the third valve 223 into the heating/cooling tank 214 and out again through the seventh valve 227 to bypass the heat pump 212 and the low temperature storage 218 and return back to the heat transfer panels 210, 211.

In this passive store mode of operation, operation is dependent on the effective ambient temperature of the environment in which the heat transfer panels 210, 211 are provided being at least a few degrees higher than a temperature of the heating/cooling tank 214. The controller 240 controls the pump 216 to pump fluid from the outlet of the heating/cooling tank 214 to the inlet side of the upper heat exchange elements 210b, 211b of the heat transfer panels 210, 211. This results in heating of the fluid to a temperature that is closer to the ambient temperature of the environment, and the warmer fluid is then passed through to the inlet of the heating/cooling tank 214. As the fluid passes through the heating/cooling tank 214, heat energy is transferred to the secondary fluid of the heating/cooling tank 214, which results in the fluid exiting being cooler then the fluid entering.

In a heat dump mode of operation, heat can be expelled from the heating/cooling tank 214, in order to cool down the secondary fluid therein, by the controller 240 controlling the first, third and sixth valves 223, 224, 226 to bypass the heat pump 212 and pass fluid in a circuit involving only the heat transfer panels 210, 211 (particularly the lower heat exchange elements 210b, 211b), the heating/cooling tank 214 and the first pump 216. By operating the system 200 in this way, the secondary fluid in the heating/cooling tank 214 can be caused to be at a temperature which is only a small amount higher then the ambient temperature of the environment in which the heat transfer panels 210, 211 are provided.

In an active from store heating mode, heat energy from the low temperature storage 218 is used to heat the hot water tank 213 or the heating/cooling tank 214. In this mode of operation, the controller 240 causes fluid to flow through the first side of the pump 212 and the low temperature storage 218 and through the upper heat exchange elements 210b, 211 of the heat transfer panels 210, 211 (although the heat transfer panels may not contribute much or anything to heating of the fluid in this circuit). The controller 240 also causes fluid to flow in a secondary circuit including the hot water tank 213 or the heating/cooling tank 214 and the second side of the heat pump 212. Additionally, the controller 240 causes operation of the heat pump 212 so as to transfer heat energy from the first side to the second side. This results in the transfer of heat energy that was originally in the low temperature storage 218, in the form of secondary material at an elevated temperature, to the heating/cooling tank 214 or hot water tank 213. During this mode of operation, the temperature of the secondary material in the low temperature storage 218 is caused to fall. However, it may be convenient to use heat energy in the low temperature storage 218 to heat the hot water tank 213 and/or the heating/cooling tank 214 in the evening and to use an elevated ambient temperature in the daytime to replenish the heat energy in the low temperature storage 218.

A passive water heating mode of operation will now be described. In this mode of operation, the heat pump 212 is bypassed. The controller 240 causes fluid to flow through the third valve 223 into the hot water tank 213 and out again through the seventh valve 227 to bypass the heat pump 212 and the low temperature storage 218 and return back to the heat transfer panels 210, 211.

In the passive water heating mode of operation, the operation is dependent on the effective ambient temperature of the environment in which the heat transfer panels 210, 211 are provided being at least a few degrees Kelvin higher than a temperature of the secondary fluid in the hot water tank 213. The controller 240 controls the pump 216 to pump fluid from the hot water tank 213 to the inlet side of the upper heat exchange elements 210b, 211b of the heat transfer panels 210, 211. This results in heating of the fluid to a temperature that is closer to the ambient temperature of the environment, and the warmer fluid is then pumped bypassing the heat pump 212 back to the hot water tank 213. As the fluid passes through the hot water tank 213, heat energy is transferred to the water contained by the hot water tank 213, which results in the fluid exiting the primary heat exchange element of the hot water tank 213 being cooler then the fluid entering it.

An enhanced passive water heating mode of operation will now be described. This mode utilises two heat transfer panels 210, 211 that are exposed to solar radiation. In the enhanced passive mode of operation, a first one of the heat transfer panels 210 is caused by the controller 240 to raise the temperature of the secondary fluid in the hot water tank 213 to approach the maximum temperature that is achievable having regard to the ambient temperature on the heat transfer panel and the amount of incident solar energy. At this time, the other heat transfer panel is not cooled by passing fluid through its heat exchangers and instead the controller 240 allows the panel to heat up to a relatively high temperature. The processor 240 then exerts control to cause the fluid to pass through the upper heat exchanger of the other, hotter, heat transfer panel instead of through the first, cooler, heat transfer panel. This causes the fluid to be heated to a higher temperature than would otherwise be achieved, and results in a boost in the temperature of the water in the hot water tank 213. The other heat transfer panel in this case may be of a different size to the first heat transfer panel. Also, the other heat transfer panel may be of a different type to the first heat transfer panel, for instance the other heat transfer panel may be a cooling panel for a photovoltaic panel whereas the first heat transfer panel is not.

By configuring the system 200 differently, the heat transfer panels 210, 211 can be bypassed in this mode of operation such that only the first pump 216, the low temperature storage 218 and the first side of the heat pump 212 (i.e. not including the heat transfer panels 210, 211) are included in the first fluid circuit.

By configuring the system differently, in particular by selectively connecting the low temperature storage 218 to the second side of the heat pump 212, the system 200 can be operable in an active store heating mode. In this mode, the controller 240 controls the heat pump 212 to transfer heat energy from the first side of the heat pump to the second side of the heat pump and to provide the heated fluid in the second side of heat pump to the low temperature storage 218. This can cause the temperature of the secondary material in the low temperature storage 218 to be heated to a temperature that is greater than the ambient temperature of the environment that contacts the heat transfer panels 210, 211.

The system 200 can be utilised to cause heating of the heat transfer panels 210, 211. This may be useful for instance where snow has accumulated on the panels, when they are on a roof for instance, whereupon heating the heat transfer panels with heat from the low temperature storage 218 or the heating/cooling tank 214 can cause the snow to melt sufficiently that it slides off of the panels. This can be to the benefit of the panels themselves but also the building on which the panels are provided since excessive snow weight can cause structural damage in some circumstances. The removal of snow using stored heat energy rather than using other energy to create heat provides a low carbon solution to snow removal. The removal of snow is particularly advantageous where the heat transfer panels 210, 211 are used as backing for photovoltaic panels (a discussion of which is provided below) because photovoltaic cells do not convert solar energy to electrical energy when covered with snow.

The low temperature storage 218 comprises a first heat exchange element, which is the wavy line shown in the figure, located within a heat storage material/medium. The heat storage medium preferably is included in an insulated housing, so is to prevent the transfer of significant quantities of heat between the heat storage medium and the environment. The low temperature storage 218 may for instance be an insulated tank that is stored in a basement or buried under the ground and containing sand, water, soil or some other material that is able to absorb heat energy. The greater the mass of the material and the greater the specific heat capacity of the material, the greater the quantity of heat energy that can be stored in the low temperature storage 218 for a given change in temperature.

As mentioned above, the system 200 comprises a first heat transfer panel 210 and a separate second heat transfer panel 211. By providing the heat transfer panels 210, 211 such that one of them is in shadow and the other one is illuminated by the sun, a temperature differential between the two panels can be reached. This allows the system 200 to be controlled such as to utilise only one of the heat transfer panels 210, 211 at a given time, and particularly to select the heat transfer panel that is most appropriate for the current mode of operation. For instance, in an active or passive heating mode of operation, the controller 240 may select the heat transfer panel 211 if that is illuminated, or at least illuminated more than the first heat transfer panel 210. In a cooling mode of operation, the controller 240 may instead select and utilise the heat transfer panel that is in shadow, which typically will be the North facing heat transfer panel 210.

The heat transfer panels 210, 211 may be provided with temperature sensors (not shown), which are connected to the controller 240. Using signals provided by the temperature sensors (not shown), the controller 240 may be able to select the one of the heat transfer panels 210, 211 that is the most appropriate for the current mode of operation. If both heat transfer panels 210, 211 are of an appropriate temperature for use in the current mode of operation, the controller 240 may control the second valve 222 or the fifth valve 225 so as to pass fluid through the appropriate heat exchange elements of both of them.

The system 200 may operate in a thermally invisible, or thermal transfer, mode of operation. In this mode of operation, heat energy may be transferred from the hottest one of the heat transfer panels, for instance the second (South) heat transfer panel 211 and stored temporarily in either the temperature storage or the heating/cooling tank 214. The heat energy may then be expelled from the system 200 through the cooler heat transfer panel, for instance the first (North) heat transfer panel 210. This can be advantageous in that it can prevent overheating of the second heat transfer panel 211. In the thermal transfer mode of operation, the system alternates between passive (or active) cooling and passive (or active) heating.

As will be appreciated from the above-described operation of the heat mat 100, the upper heat exchangers 210a, 211a are used when the heat transfer panels 210, 211 is required to take heat energy from the environment and provide it to the system 200, whereas the lower heat exchange elements 210b, 211b are used when the heat transfer panels 210, 211 are required to expel energy to the environment. The switching of the fluid through the different heat exchangers is achieved in the system through the use of the first valve 221 which is controllable by the controller 240 to result in the required mode of operation of the heat transfer panel.

In some embodiments of the invention, the heat transfer panel 700 is provided as backing for a photovoltaic panel 250, 251 (FIG. 10) comprising one or more photovoltaic cells. In these embodiments, thermal coupling between the photovoltaic cells and the heat mat 100 is provided, for instance using a thermally conductive paste or adhesive. The heat transfer panel 700 provides cooling for the photovoltaic cells in that the heat mat 100 removes heat energy from the photovoltaic cells and transfers it to the fluid in the heat exchanger 130. This improves the efficiency of operation of the photovoltaic cells (efficiency of photovoltaic cells decreases as temperature increases). Moreover, the isothermal nature of the heat mat 100 provides an advantage over other photovoltaic cells cooling arrangements. In particular, the isothermal nature of the heat mat 100 causes the photovoltaic cells of a panel 250, 251 to be at the same or approximately the same temperature. Because the overall efficiency of a photovoltaic panel is dependent on the temperature of the hottest photovoltaic cell in the panel, the isothermal nature of the heat mat 100 improves efficiency of the panel as a whole.

Figure 9:
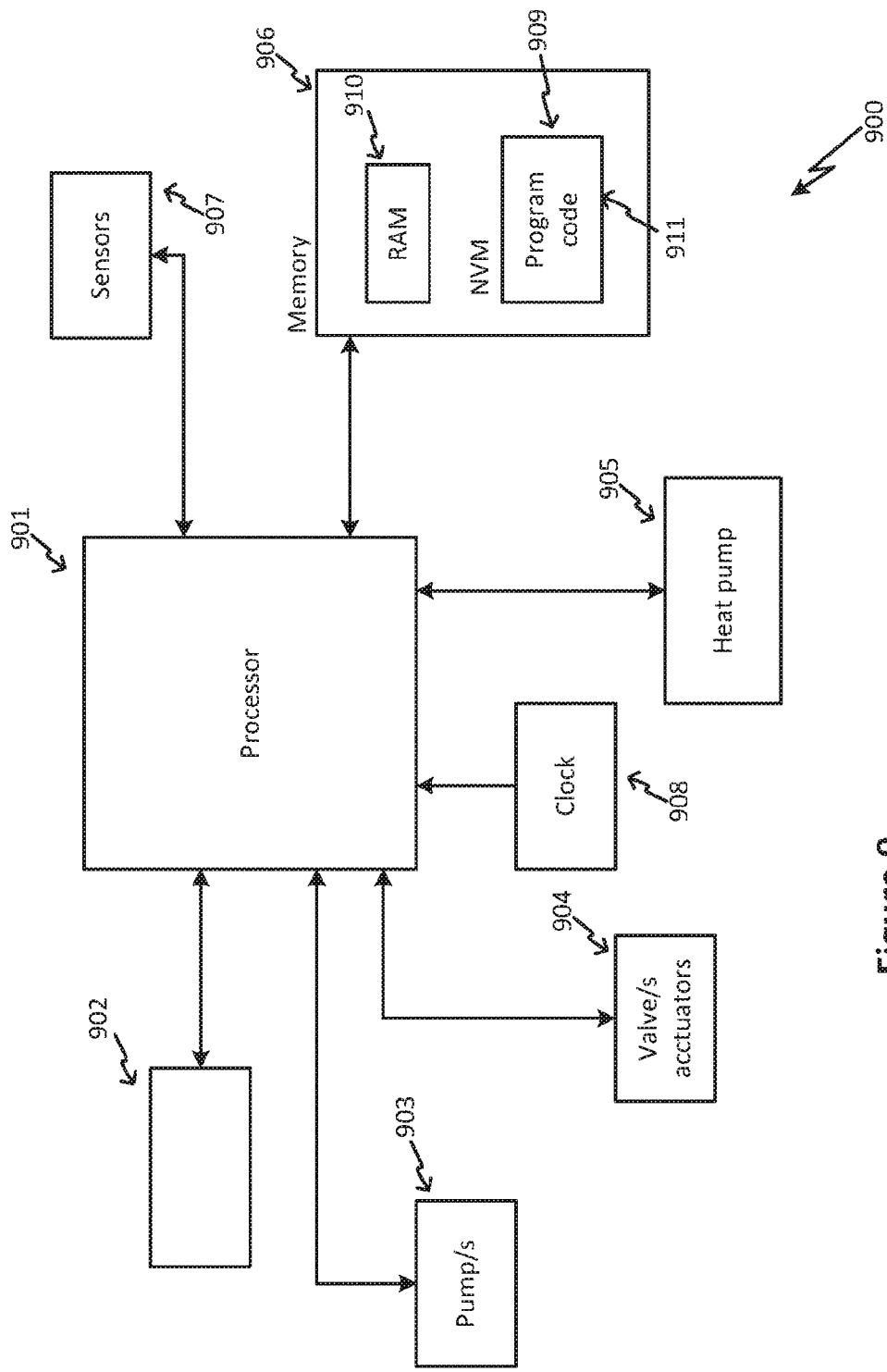
FIG. 9 is a schematic diagram of components of a controller of the FIG. 7 system.

FIG. 9 is a schematic diagram of the heating system controller 240. Some of the internal components of the controller 240 are shown in FIG. 9. The controller 240 includes a processor 901. The processor 901 controls operation of the other hardware components of the controller 240. The processor 901 and other hardware components may be connected via a system bus (not shown). Each hardware component may be connected to the system bus either directly or via an interface.

The controller 240 is connected to the control interface of at least a water pump 903, valve actuators 904, at least a heat pump 905 and temperature sensors 907. The controller 240 comprises working or volatile memory, such as Random Access Memory (RAM), 910 and a non-volatile memory 909. The non-volatile memory 909 stores a heat monitoring and regulating application in the form of program code 911, as well as storing data files and associated metadata. The program code 911 may be provided in the controller 240 on manufacture.

The controller 240 comprises a user interface display 902. The display may be a touch sensitive display having a display part and a tactile interface part. The controller 240 is connected to the mains to power the controller 240.

The processor 901 is configured to send and receive signals to and from the other components in order to control operation of the other components. For example, the processor 901 controls the display of content on display 902 and receives signals as a result of user inputs from tactile interface. The display 902 may be a resistive touch screen or capacitive touch screen of any kind. The display may alternatively not be a touch screen. For instance it may be a liquid crystal display (LCD).

The processor 901 may be an integrated circuit of any kind. The processor 901 may access RAM 910 in order to process data and may control the storage of data in memory 909. Memory 909 may be a non-volatile memory of any kind such as a Read Only Memory (ROM), a flash memory and a magnetic drive memory. The RAM 910 may be a RAM of any type, for example Static RAM (SRAM), Dynamic RAM (DRAM) or a Flash memory.

The processor 901 operates under control of the program code 911. The program code 911 may comprise code relating to hardware such as the display 902, as well as the basic operation of the controller 240. The program code 911 may also cause activation of other software modules stored in the memory 909 as needed.

Figure 10:
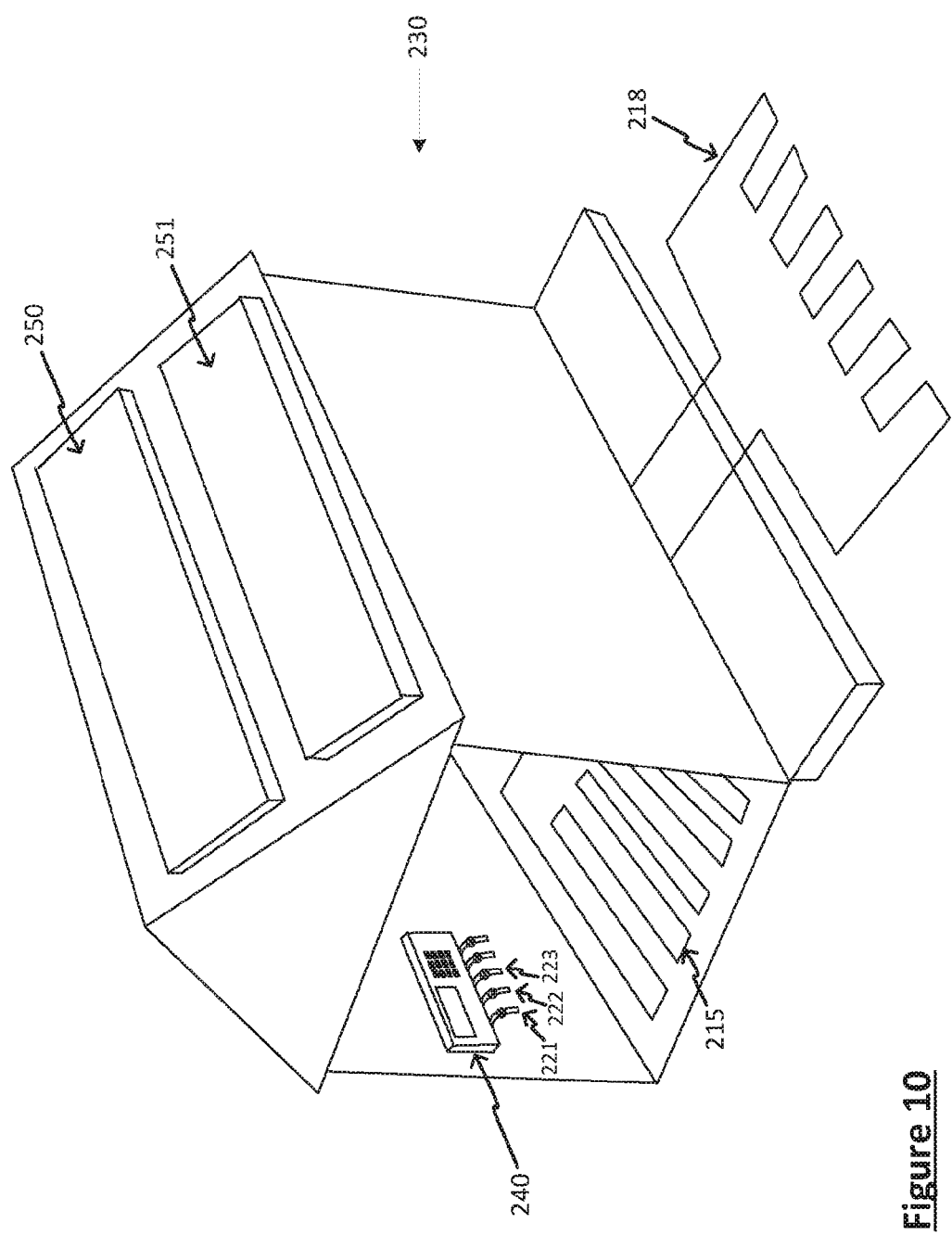
FIG. 10 is a schematic diagram showing the FIG. 7 system installed in a building.

FIG. 10 shows the heat transfer panels 700 installed in a building 230, in this case a house. Photovoltaic panels 250, 251 obscure heat transfer panels 210, 211, which thus are not visible. The heat transfer panels 210, 211 provide backing for and cooling of the photovoltaic panels 250, 251, under control of the processor 240. The low temperature storage 218 is shown as being located underneath land adjacent the house 230. The underfloor heating 215 is present in a floor of the house 230.

Figure 11:
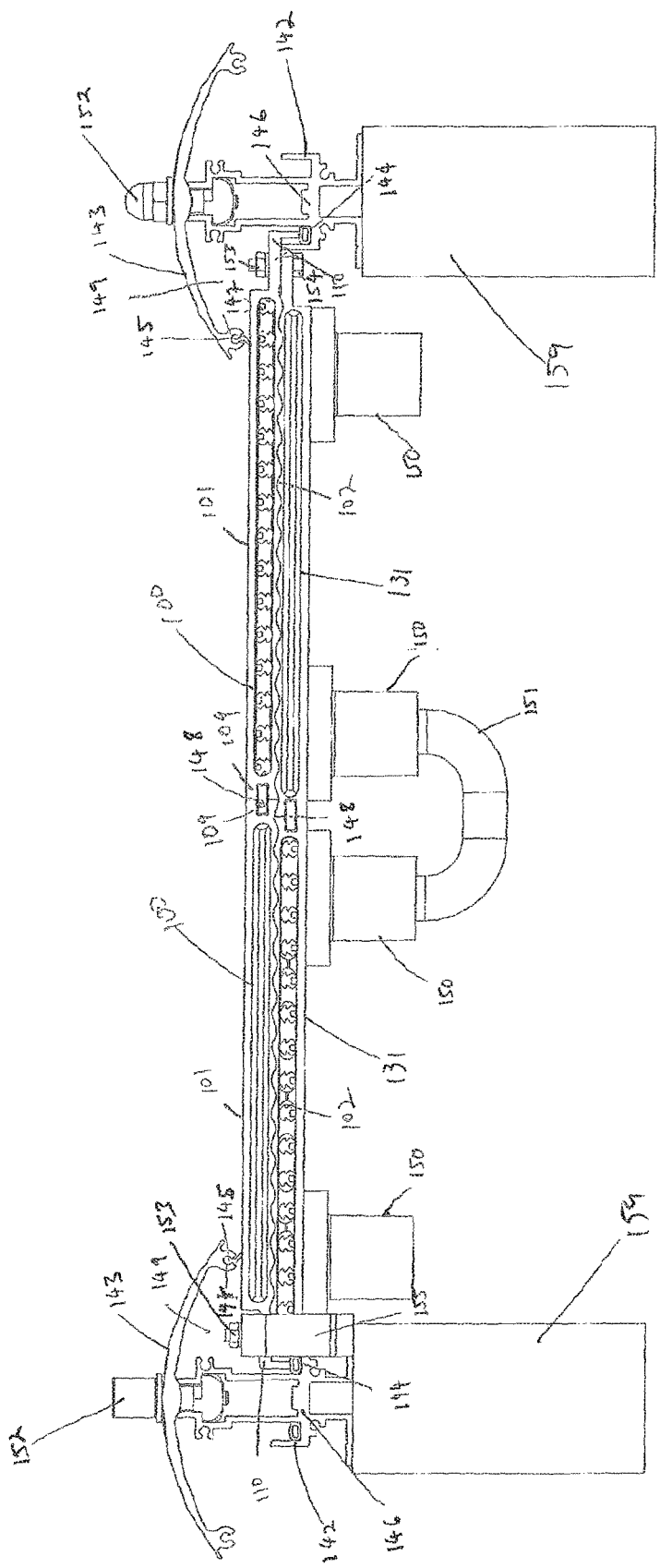
FIG. 11 is a cross-section drawing of heat transfer panels of the FIG. 7 system installed on a roof.

FIGS. 11 and 12 shows a supporting arrangement configured to support the heat transfer panel 700, in particular the heat mat 100 and the second heat exchange element 131. The supporting arrangement comprises a supporting bracket 146 mounted on a supporting column 159. The supporting bracket 146 has a protruding raised arm 142 at either sides of the bracket forming two rectangular recesses (y). Within one of the recess is provided a sealing pipe 144 made of rubber for example. Fastened to the top of the supporting bracket 146 is a cover plate 143 of a part-circular shape extending symmetrically over the supporting bracket 146. At each end of the part-circular cover plate is a c-shaped protrusion 147 forming a recess. Within the recess is a rubber tongue seal 145 that extends out of the recess. The cover plate 143, supporting bracket 146 and supporting column 159 make up the supporting arrangement.

The heat mat 100 has an edge on its main body with a connecting slot 109, which can receive a corresponding rib of another heat mat 100 so as to allow the connection of multiple heat mats together. In FIG. 11, two heat mats 100 are connected together as described above. The two slots 109 are aligned in such a way that they form a closed rectangular slot where a rectangular connector rib 148 is housed.

Mechanically clamped to the undulating surface 102 of the heat mats 100 using bolts 154 and nuts 153 are a pair of heat exchange elements 131. The heat exchange elements 131 have the same cross section profile as the heat mats 100. The pair of heat exchange elements 131 is also connected together using a rectangular connector rib 148 placed in the rectangular slot created by placing two heat exchange elements 131 together and is in thermal contact with the heat mats 100. Thermal contact may be achieved by applying thermal paste between the two contact surfaces of the heat exchange elements 131 and heat mats. Each heat exchange element 131 is provided with an inlet and outlet protrusion 150 to allow fluid to enter and exit the heat exchange element. The outlet protrusion 150 of the first heat exchange element 131 is connected to the inlet protrusion 150 of the second heat exchange element 131 using a connecting U-shaped pipe 151.

Located at the outer edge of the heat mats 100 are two brackets 110, to allow the heat mats 100 to be connected to the supporting bracket 146. The bracket no rests on the sealing pipe 144 located in the rectangular recess created by the protruding raised arm 142, forming an interlocking configuration. When the heat exchange panel 700 is mounted on the supporting brackets 146, the rubber tongue 145 rests firmly against the flat surface 101 of the heat exchange panel 100. The rubber tongue 145 and sealing pipe 144 forms a liquid tight cavity 149.

The supporting arrangement is use to provide mechanical support and elevate the heat exchange panel 700 from the installation surface such as the roof of a house. Where the flat surface 100 of the heat mat 100 is exposed to the elements, the rubber tongues 145 provides weatherproofing by preventing snow or water from rain or condensation to collect and get trapped in the cavity 149. The elevation provides space to accommodate additional pipe work and the heat exchange element 131 inlet and outlet protrusions 150.

The inlet protrusion 148 of the first heat exchange element 131 and the outlet protrusion of the second heat exchange element 131 can be connected to the central heating system within the building where a pump can be used to drive fluid through the heat exchange elements 131 to effectively transfer heat to and from the heat mats 100. The cover plate 143 has a part-circular shape to allow snow and water to flow freely over it and the heat mats 100 and then collect in the roof gutter for drainage. The rubber sealing pipes 144 provides a seal for the cavity 149 and also helps to cushion and grip the heat exchange panel 700 when mounted on the supporting brackets 146.

The rubber tongue 145 and rubber sealing pipe 144 may be made of an alternative material made up of synthetic compounds such as silicone rubber or rubberised plastic. The connecting surfaces between the heat exchange panel 100 and the heat exchange element 131 can have any undulating profile. The supporting columns 159 can be made of any suitable material for example plastic or wood. The connecting U-shaped pipe 151 and the inlet and outlet protrusions 150 can be made of the same material as the heat exchange element 131. Alternatively, they can be made of copper or other suitable material.

Various effects and advantages will now be described.

In the various modes of operation, the system 200 can provide efficient heating and/or cooling, and can use significantly less energy to achieve a given amount of heating or cooling than a corresponding conventional arrangement. This is due in large part to the use of the heat transfer panels 210, 211, in particular because they allow fast and effective communication of heat energy between the environment and the system 200.

The heat transfer panels 210, 211 are modular. This means that heating and cooling capacity within the house can be increased as and when required, given sufficient roof area. The heat transfer panels 210, 211 are modular because the heat exchange elements 210a, 210b, 211a, 211b (130, 131) are separable from the heat mat 100 and thus the heat mat 100 can be replaced with a differently sized component.

The separation of the fluid in the circuits including the heat exchange elements 210a, 210b, 211a, 211b from the fluid in the heat mats 100 themselves gives rise to a number of advantages. Particularly, there is less fluid in the circuits including the heat exchange elements 210a, 210b, 211a, 211b than in corresponding single circuit systems.

This simplifies maintenance, and allows more simple draining and replacement of the fluid. Where glycol is used in the fluid, periodic replacement is important so this is a significant advantage. It also reduces the possibility (or extent) of damage if there is a fluid leak in the circuits including the heat exchange elements 210a, 210b, 211a, 211b. Additionally, it allows the fluid used in the heat mats 100 to be optimised for the operating conditions of the heat mat whilst allowing the fluid in the circuits including the heat exchange elements 210a, 210b, 211a, 211b to be optimised for that part of the system. Since the heat mats 100 may be exposed to very different conditions to the other components of the system, quite different fluids may be used, giving rise to improved system performance compared to a single fluid system.

The system 200 is environmentally friendly as it is based on renewable energy, in particular environmental heat and optionally also solar energy.

The system 200 achieves dual functionality, unlike most conventional systems, in that it can both heat and cool water or space in a building.

The invention claimed is:

1. A system comprising:
   a first heat exchange panel and a second heat exchange panel, each of the first heat exchange panel and the second heat exchange panel comprising:
      a main body comprising a sealed cavity in which is provided a fluid in both liquid and gas phases and being configured to communicate heat energy by allowing evaporation of the fluid at one location and condensation of the fluid at a different location in the sealed cavity; and
      a first heat exchanger part including an inlet and an outlet for passing of fluid through the first heat exchanger part;
   a heat pump;
   a controller;
   a heat tank, for providing one or more of a heating fluid for a central heating system and hot water,
   plural controllable valves; and
   one or more fluid pumps,
   wherein the system is operable in an active heating mode of operation in which the controller controls the heat pump, the one or more fluid pumps and the plural controllable valves to provide the system with:
      a first fluid circuit in which fluid is pumped through the first heat exchange panel and a first side of the heat pump,
      a second fluid circuit in which fluid is pumped through the heat tank and a second side of the heat pump, and
      a transfer, by the heat pump, of heat energy from the first fluid circuit to the second fluid circuit; and
   wherein the system is operable in an enhanced passive heating mode of operation in which the controller controls the heat pump, the one or more fluid pumps and the plural controllable valves:
      in a first phase to provide the system with a third fluid circuit in which fluid is pumped through the first heat exchange panel, but not through the second heat exchange panel, to the heat tank bypassing the heat pump; and
      in a second phase to provide the system with a fourth fluid circuit in which the fluid is pumped through the second heat exchange panel, but not through the first heat exchange panel, to the heat tank bypassing the heat pump.

2. The system as claimed in claim 1, wherein the system is operable in a passive heating mode of operation in which the controller controls the heat pump, the one or more fluid pumps and the plural controllable valves to provide the system with a fluid circuit in which fluid is pumped through the first heat exchange panel and the heat tank and bypasses the heat pump.

3. The system as claimed in claim 1, wherein the system is operable in a passive store mode of operation in which the controller controls the heat pump, the one or more fluid pumps and the plural controllable valves to provide the system with a fluid circuit in which fluid is pumped through the first heat exchange panel and a low temperature storage device without operating the heat pump.

4. The system as claimed in claim 1, wherein the first heat exchange panel comprises a second heat exchanger part including an inlet and an outlet for passing of fluid through the first heat exchanger panel, the second heat exchanger part being thermally coupled to a heat spreading part so as to communicate heat energy from the environment in which the heat spreading part is located to fluid flowing through the second heat exchanger part and wherein the second heat exchanger part is located at a higher location on the first heat exchange panel than the first heat exchanger part.

5. The system as claimed in claim 4, wherein the system is operable in one or more of a snow clearing mode of operation and an active cooling mode of operation in which the controller controls the heat pump, the one or more fluid pumps and the plural controllable valves to provide the system with:
   a fifth fluid circuit in which fluid is pumped through the second heat exchanger part of the first heat exchange panel and a first side of the heat pump,
   a sixth fluid circuit in which fluid is pumped through the heat tank and a second side of the heat pump, and
   a transfer, by the heat pump, of heat energy to the fifth fluid circuit from the sixth fluid circuit.

6. The system as claimed in claim 5, wherein the system is operable in a passive snow clearing mode of operation in which the controller controls the heat pump, the one or more fluid pumps and the plural controllable valves to provide the system with a fluid circuit in which fluid is pumped through the second heat exchanger part of the first heat exchange panel and a low temperature storage device without operating the heat pump.

7. The system as claimed in claim 1, wherein the first heat exchange panel and the second heat exchange panel are mounted on a roof of a building.

8. The system as claimed in claim 1, further comprising:
   one or more weatherproofing seals, wherein the first heat exchange panel is secured to a building via the one or more weatherproofing seals.

9. A system comprising:
   at least one heat exchange panel comprising:
      a main body comprising a sealed cavity in which is provided a fluid in both liquid and gas phases and being configured to communicate heat energy by allowing evaporation of the fluid at one location and condensation of the fluid at a different location in the sealed cavity; and
      a first heat exchanger part including an inlet and an outlet for passing of fluid through the first heat exchanger part, the first heat exchanger part being thermally coupled to the main body so as to communicate heat energy to fluid flowing through the first heat exchanger part from the main body and thus to an environment in which the main body is present;

a second heat exchanger part including an inlet and an outlet for passing of fluid through the second heat exchanger part, the second heat exchanger part being thermally coupled to the main body so as to communicate heat energy to the environment in which the main body is present from fluid flowing through the second heat exchanger part, and wherein the second heat exchanger part is located at a lower location on the main body than the first heat exchanger part;

a heat pump;

a controller;

a heat tank, for providing one or more of a heating fluid for a central heating system and hot water, plural controllable valves; and one or more fluid pumps, wherein the controller is configured to cause control of the heat pump, the one or more fluid pumps, and the plural controllable valves to cause the system to operate in a number of different modes of operation, wherein the system is operable in an active heating mode of operation in which the controller controls the heat pump, the one or more fluid pumps and the plural controllable valves to provide the system with:

a first fluid circuit in which fluid is pumped through the first heat exchanger part of the at least one heat exchange panel and a first side of the heat pump, a second fluid circuit in which fluid is pumped through the heat tank and a second side of the heat pump, and transfer by the heat pump, heat energy from the first fluid circuit to the second fluid circuit, and wherein the system is also operable in one or more of a snow clearing mode and active cooling mode of operation in which the controller controls the heat pump, the one or more fluid pumps and the plural controllable valves to provide the system with:

a third fluid circuit in which fluid is pumped through the second heat exchanger part of the at least one heat exchange panel and the first side of the heat pump, the second fluid circuit in which fluid is pumped through the heat tank and the second side of the heat pump, and a transfer by the heat pump, of heat energy to the third fluid circuit from the second fluid circuit.

10. The system as claimed in claim 9, wherein the system is operable in a passive heating mode of operation in which the controller controls the heat pump, the one or more fluid pumps and the plural controllable valves to provide the system with a fourth fluid circuit in which fluid is pumped through the at least one heat exchange panel and the heat tank and bypasses the heat pump.

11. The system as claimed in claim 9, wherein the system is operable in a passive store mode of operation in which the controller controls the heat pump, the one or more fluid pumps and the plural controllable valves to provide the system with a fifth fluid circuit in which fluid is pumped through the at least one heat exchange panel and a low temperature storage device without operating the heat pump.

12. The system as claimed in claim 9, wherein the system includes at least a first heat exchange panel and a second heat exchange panel.

13. The system as claimed in claim 12, wherein the system is operable in an enhanced passive heating mode of operation in which the controller controls the heat pump, the one or more fluid pumps and the plural controllable valves:

in a first phase to provide the system with a sixth fluid circuit in which fluid is pumped through the first heat exchange panel, but not through the second heat exchange panel, to the heat tank bypassing the heat pump, and in a second phase to provide the system with a seventh fluid circuit in which the fluid is pumped through the second heat exchange panel, but not through the first heat exchange panel, to the heat tank bypassing the heat pump.

14. The system as claimed in claim 12, wherein the system includes at least the first heat exchange panel and the second heat exchange panel and is operable in a thermal transfer mode in which the controller controls the heat pump, the one or more fluid pumps and the plural controllable valves to take in heat energy from the first heat exchange panel of the at least one heat exchange panel and to expel heat energy through the second heat exchange panel of the at least one heat exchange panel.

15. The system as claimed in claim 9, wherein the system is operable in a passive snow clearing mode of operation in which the controller controls the heat pump, the one or more fluid pumps and the plural controllable valves to provide the system with an eighth fluid circuit in which fluid is pumped through the second heat exchanger part of the heat exchange panel and a low temperature storage device without operating the heat pump.

16. The system as claimed in claim 9, wherein the at least one heat exchange panel is mounted on a roof of a building.

17. The system as claimed in claim 9, further comprising: one or more weatherproofing seals, wherein the at least one heat exchange panel is secured to a building via the one or more weatherproofing seals.

18. A system comprising:

a first heat exchange panel and a second heat exchange panel, each of the first heat exchange panel and the second heat exchange panel comprising:

a main body comprising a sealed cavity in which is provided a fluid in both liquid and gas phases and being configured to communicate heat energy by allowing evaporation of the fluid at one location and condensation of the fluid at a different location in the sealed cavity; and a first heat exchanger part including an inlet and an outlet for passing of fluid through the first heat exchanger part;

a heat pump;

a controller;

a heat tank for providing one or more of a heating fluid for a central heating system and hot water;

plural controllable valves; and one or more fluid pumps;

wherein the system is operable in a thermal transfer mode in which the controller controls the heat pump, the one or more fluid pumps, and the plural controllable valves to take in heat energy from the first heat exchange panel and to expel heat energy through the second heat exchange panel;

wherein the system is operable in an active heating mode of operation in which the controller controls the heat pump, the one or more fluid pumps and the plural controllable valves to provide the system with:
- a first fluid circuit in which fluid is pumped through the first heat exchange panel and a first side of the heat pump;
- a second fluid circuit in which fluid is pumped through the heat tank and a second side of the heat pump; and
- transfer by the heat pump, heat energy from the first fluid circuit to the second fluid circuit.

19. The system as claimed in claim 18, wherein the system is operable in a passive heating mode of operation in which the controller controls the heat pump, the one or more fluid pumps and the plural controllable valves to provide the system with a fluid circuit in which fluid is pumped through the at first exchange panel and the heat tank and bypasses the heat pump.

20. The system as claimed in claim 18, wherein the system is operable in a passive store mode of operation in which the controller controls the heat pump, the one or more fluid pumps and the plural controllable valves to provide the system with a fluid circuit in which fluid is pumped through the first heat exchange panel and a low temperature storage device without operating the heat pump.

21. The system as claimed in claim 18, wherein the first heat exchange panel comprises a second heat exchanger part including an inlet and an outlet for passing of fluid through the first heat exchanger panel, the second heat exchanger part being thermally coupled to a heat spreading part so as to communicate heat energy from the environment in which the heat spreading part is present to fluid flowing through the second heat exchanger part and wherein the second heat exchanger part is located at a higher location on the first heat exchange panel than the first heat exchanger part.

22. The system as claimed in claim 21, wherein the system is operable in one or more of a snow clearing mode of operation and an active cooling mode of operation in which the controller controls the heat pump, the one or more fluid pumps and the plural controllable valves to provide the system with:
- a fifth fluid circuit in which fluid is pumped through the second heat exchanger part of the first heat exchange panel and a first side of the heat pump,
- a sixth fluid circuit in which fluid is pumped through the heat tank and a second side of the heat pump, and
- transfer by the heat pump, heat energy to the fifth fluid circuit from the sixth fluid circuit.

23. The system as claimed in claim 22, wherein the system is operable in a passive snow clearing mode of operation in which the controller controls the heat pump, the one or more fluid pumps and the plural controllable valves to provide the system with a fluid circuit in which fluid is pumped through the second heat exchanger part of the first heat exchange panel and a low temperature storage device without operating the heat pump.

24. The system as claimed in claim 18, wherein the first heat exchange panel and the second heat exchange panel are mounted on a roof of a building.

25. The system as claimed in claim 18, wherein the first heat exchange panel is secured to a building using a weatherproofing member.

* * * * *